US008281990B2

(12) United States Patent
Silbernagl

(10) Patent No.: US 8,281,990 B2
(45) Date of Patent: Oct. 9, 2012

(54) PUBLIC TRANSIT SYSTEM FARE PROCESSOR FOR TRANSFERS

(75) Inventor: Martin Friedrich Ludwig Silbernagl, Berlin (DE)

(73) Assignee: Smart Systems Innovations, LLC, New York, NY (US)

( * ) Notice: Subject to any disclaimer, the term of this patent is extended or adjusted under 35 U.S.C. 154(b) by 306 days.

(21) Appl. No.: 12/511,037

(22) Filed: Jul. 28, 2009

(65) Prior Publication Data

US 2009/0283591 A1 Nov. 19, 2009

Related U.S. Application Data

(63) Continuation-in-part of application No. 11/668,456, filed on Jan. 29, 2007, now Pat. No. 7,568,617, and a continuation-in-part of application No. 11/838,499, filed on Aug. 14, 2007, now Pat. No. 7,566,003.

(60) Provisional application No. 60/869,112, filed on Dec. 7, 2006.

(51) Int. Cl.
*G06K 5/00* (2006.01)

(52) U.S. Cl. ......... 235/382; 235/375; 235/380; 235/487

(58) Field of Classification Search .................. 235/375, 235/381–382
See application file for complete search history.

(56) References Cited

U.S. PATENT DOCUMENTS

| 6,910,628 | B1 * | 6/2005 | Sehr | 235/384 |
| 2002/0029165 | A1 | 3/2002 | Takatori et al. | |
| 2006/0278704 | A1 * | 12/2006 | Saunders et al. | 235/382 |
| 2008/0156873 | A1 * | 7/2008 | Wilhelm et al. | 235/384 |

OTHER PUBLICATIONS

"Contactless Payments Powered by MasterCard PayPass®" downloaded from http://www.mastercard.com/us/paypass/subway/about/contactless.html on Oct. 26, 2006, 1 page.

"MasterCard and Citi Conduct Consumer Trial of Contactless Payments with MTA in Select NYC Subway Stations" downloaded from http://www.mastercard.com/us/paypass/subway/about/subwaytrial_newsrelease_30Jan20. . . on Oct. 26, 2006, 2 pages.

"Turnstile. Turbostyle. Speed through with a tap." downloaded from http://www.mastercard.com/us/paypass/subway/index.html on Oct. 26, 2006, 1 page.

"Subway Fares Overview; The NYC Subway Trial Fare Options Using Contactless Payments" downloaded from http://www.mastercard.com/us/paypass/subway/faresoverview/index.html on Oct. 26, 2006, 1 page.

* cited by examiner

*Primary Examiner* — Tuyen K Vo
(74) *Attorney, Agent, or Firm* — Silicon Valley Patent Group LLP

(57) ABSTRACT

An implementation of a system and method for processing transfer rides associated with at least one public transit network is provided. The system and method preprocess transactions to consolidate or eliminate unnecessary transactions with a financial institution clearing and settlement network.

45 Claims, 10 Drawing Sheets

PUBLIC TRANSIT SYSTEM FARE PROCESSOR FOR TRANSFERS

CROSS-REFERENCE TO RELATED APPLICATIONS

This application is a continuation-in-part of and claims the benefit under 35 U.S.C. 120 from U.S. Pat. No. 7,566,003 (application Ser. No. 11/838,499 entitled "Learning Fare Collection System for Mass Transit" filed Aug. 14, 2007), which is incorporated herein by reference. In addition, this application is a continuation-in-part of and claims the benefit under 35 U.S.C. 120 from U.S. Pat. No. 7,568,617 (application Ser. No. 11/668,456 also entitled "Learning Fare Collection System for Mass Transit" filed Jan. 29, 2007), which is incorporated herein by reference. This application also claims the benefit under 35 U.S.C. 119(e) from U.S. Provisional Application No. 60/869,112, filed Dec. 7, 2006, which is incorporated herein by reference.

BACKGROUND OF THE INVENTION

1. Field of the Invention

The invention relates generally to public transit system access and more specifically to identifying transfers within one or more transit systems using information from a bankcard, such as a credit card or debit card.

2. Background of the Invention

In cases where a commodity or a service is to be purchased from a merchant using a bankcard and a conventional card inquiry system, the card is inserted into a card reader, so that the magnetic stripe of the card passes through and in contact with the card reader. The card number and other data contained on the magnetic stripe's tracks are read by the card reader. The card reader transmits data, including transaction amount, through an electric line (traditionally a telephone line) to the merchant's acquirer (also called merchant bank). The acquirer is in turn connected to clearing and settlement networks through which the transaction is checked with regard to card validity and funds availability. The network then transmits an approval number or a disapproval number through the merchant's acquirer to the card reader.

However, the above described conventional card inquiry system takes at best several seconds to complete, because the transaction has to pass through several networks before reaching an authoritative entity (usually the card's issuing bank). Such a consumption of time in the conventional system has been a serious impediment in broadening markets of credit card utilization. Even if the communication speed could be accelerated, access to a telecommunication network is not available in all places where payments are made.

Therefore, a need exists to decrease an average latency when approving access to a high volume system such as a public transit system.

SUMMARY

An implementation of a system and method for processing transfer rides associated with at least one public transit network is provided. The system and method preprocess transactions to consolidate or eliminate unnecessary transactions with a financial institution clearing and settlement network.

Embodiments of the present invention include a transit system rules processor for timepasses. A timepass is a fare product that entitles using a transit system multiple times over a predefined period for a flat fee. Some embodiments of the present invention provide for a method of processing presentation records associated with at least one public transit network supporting an advanced-purchase fare product, the method comprising: processing a timepass record, wherein the timepass record comprises an indication of duration and an identifier to a first transit account, and wherein the act of processing the timepass record comprises receiving the timepass record representing an advance purchase of a fare product; and updating memory to indicate the first transit account identified by the timepass record is enabled for a timepass product; and processing a first presentation record, wherein the first presentation record comprises a timestamp and an identifier to the first transit account, and wherein the act of the first processing presentation record comprises receiving the first presentation record; searching the memory and determining the first transit account identified by the identifier in the first presentation record is enabled for the timepass product; and providing a discount associated with the timepass product; and processing a second presentation record, wherein the second presentation record comprises a timestamp and an identifier to a second transit account, and wherein the act of the second processing presentation record comprises receiving the second presentation record; searching the memory and determining the second transit account identified by the identifier in the second presentation record is not enabled for a timepass product; and applying a non-timepass fare rule. Some embodiments of the present invention provide for a means-for apparatus for performing this method or a computer and/or computer-readable medium having memory, wherein the memory includes machine-readable code for performing this method. In some embodiments the transit account may be very simplistic in that it is no more than a balance associated with a payment account, such as a credit or debit card. Creation of new transit accounts may be fully automatic, e.g. upon a presentation of a new credit card in a blacklist-based system.

Some embodiments of the present invention provide for a processing system associated with at least one public transit system, the processing system comprising: at least one processor; a first interface coupled to the at least one processor and coupled to receive a plurality of presentation records from the at least one public transit system; memory coupled to the at least one processor, wherein the memory is configured to hold the received plurality of presentation records; fare rules; and transit account data comprising an account state for a plurality of transit accounts; and a second interface coupled to the at least one processor and coupled to communicate to a payment gateway to settle the plurality of transit accounts; wherein the at least one processor is configured to apply the fare rules to the received plurality of presentation records.

These and other aspects, features and advantages of the invention will be apparent from reference to the embodiments described hereinafter.

BRIEF DESCRIPTION OF THE DRAWINGS

Embodiments of the invention will be described, by way of example only, with reference to the drawings.

DETAILED DESCRIPTION OF THE INVENTION

Figure 1:
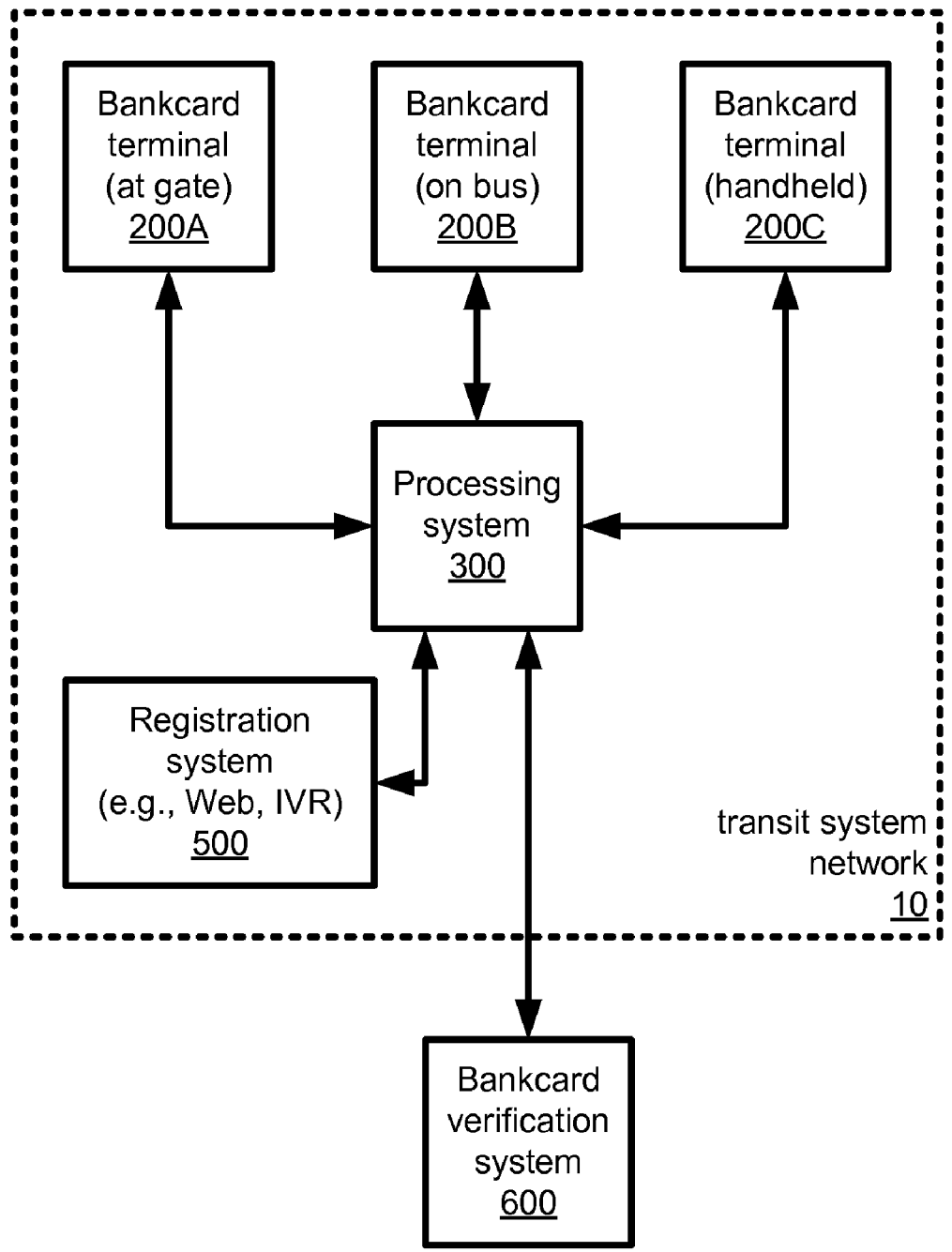
FIG. 1 shows a transit system network with an associated processing system and various components, in accordance with embodiments of the present invention.

In the following description, reference is made to the accompanying drawings, which illustrate several embodiments of the present invention. It is understood that other embodiments may be utilized and mechanical, compositional, structural, electrical, and operational changes may be made without departing from the spirit and scope of the present disclosure. The following detailed description is not to be taken in a limiting sense. Furthermore, some portions of the detailed description that follows are presented in terms of procedures, steps, logic blocks, processing, and other symbolic representations of operations on data bits that can be performed in electronic circuitry or on computer memory. A procedure, computer executed step, logic block, process, etc., are here conceived to be a self-consistent sequence of steps or instructions leading to a desired result. The steps are those utilizing physical manipulations of physical quantities. These quantities can take the form of electrical, magnetic, or radio signals capable of being stored, transferred, combined, compared, and otherwise manipulated in electronic circuitry or in a computer system. These signals may be referred to at times as bits, values, elements, symbols, characters, terms, numbers, or the like. Each step may be performed by hardware, software, firmware, or combinations thereof.

A network of transit systems includes one or more transit systems providing local, regional and/or long distance commuter transportation. This transportation takes in the form of mass transit, shuttle or taxi services by way of roads, railways, air and waterways using one or more modes of transportation, such as by bus, shuttle, trolley, train, light rail, heavy rail, subway and/or the like. Typically, a commuter purchases a ticket or other pass, which permits access to the transit system. Some transit systems require a commuter to purchase a transit coin, which the commuter deposits into a turnstile to open a gate. Use of a transit system may be regulated by a physical gate or turnstile or controlled by a conductor. Alternatively, use of a transit system may be un-gated. For example, it may be regulated using a pass or by an honor system, such as found in a transit system having an un-gated, open platform. In some transit systems employing an honor system, a conductor may occasionally verify that commuters have a valid pass.

In accordance with embodiments of the present invention, a transit system may allow a commuter to enter the transit system using a pre-registered bankcard. In some embodiments, a transit system may allow the commuter to enter the transit system using an unregistered bankcard. A bankcard assists in uniquely identifying an account of funds, contains digital data in memory, provides for access to at least some of its digital data by an external device, and may provide for contactless data transfer.

Hereinafter, a bankcard, such as a credit card or a debit card, is a payment token that may be linked to a bank account or credit line. Bankcards include cards and tokens in any of a number of form factors. A bankcard may be dimensioned in accordance with ISO 7810/7813 ID1 (about 3.375"×2.125"× 0.0030", commonly know as "Credit Card Format"). Alternatively, a bankcard may take other forms. A bankcard may take the form of a key fob (e.g., as issued by Speedpass™) or wristband. Alternatively, the bankcard may be embedded into, integrated with or be emulated by a mobile phone or other handheld device. A bankcard includes memory to hold an identifier used to uniquely identify an account for billing. The memory may be in the form of a magnetic stripe and/or may be attached to circuitry, which may be in accordance to ISO 7816. A bankcard may include or be integrated with contactless circuitry, such as ISO 14443. In some embodiments, a bankcard includes a token issued by a third party that is not a transit agency, such as a bank, credit union, a government agency (issuing a state driver's license or DMV issued identification card, federal government issued passport and/ or other government issued ID).

In some embodiments, a bankcard reader may be used by a retailer, service provider and other merchant to accept payment from a bankcard holder's payment account. Bankcard readers may be located in a variety of places such as stores and kiosks. Clearing and settlement networks may be used by a retailer, service provider and other merchant to receive payment from an account holder's credit card or debit card account via the merchant's acquirer. An example of a clearing and settlement network are computing resources available via the MasterCard® Banknet® telecommunications network, such as the Global Clearing Management System (GCMS), and the Settlement Account Management (SAM) system. Another are the resources available through VISA® VisaNet. An account holder linked to a bankcard may belong to the bankcard holder or, alternatively, may be linked to another entity such as the bankcard holder's employer, parent, spouse or other family member. For additional detail, see U.S. Pat. No. 5,828,044, the contents of which are incorporated by reference herein.

Were it not for the desire to prevent fraud and abuse of such a system, its design would be very straightforward; a payment terminal would simply buffer and store the data of all cards presented until it eventually connects to the acquirer. Unfortunately, experience dictates that systems should be equipped with a means to prevent fraud. As described above, a conventional terminal contacts the card's issuer. A system abandoning the procedure of immediate verification brings about a need for an alternative scheme or technique to limit fraud and abuse.

A solution to both of the above problems is a system that can accept bankcards off-line and can also provide an acceptable business risk of accepting bad bankcards. In such a system, payment terminals are communicating transaction data to the acquirer asynchronously (meaning the payment terminal records a transaction's data, including card data, for later communication to the acquirer). Additionally, the terminal decides off-line whether a card should be accepted or denied. In other words, the terminal does not contact the card's issuer to obtain authorization for the transaction. An issuer (or its agent) issues bankcards to cardholders. An issuer may be an institution such as a retail bank (e.g., Chase, CitiBank), a credit card company (e.g., Capital One, MBNA and Providian), or a network (e.g., American Express).

One method maintains a black list (e.g., see, U.S. Pat. No. 5,828,044). In this method, the payment terminal uses a periodically updated black list to support the approval-denial decision. In accordance with the current invention, a system using this method would place a card identifier on a black list if charges to the card holder's account could not be cleared. Placing the card on the black list aids in preventing future charges that may also fail to clear. In some embodiments, a card is placed on a black list with a single failed clearing attempt. In other embodiments, a card is placed on the black list after a predetermined number of failures of a clearing occur. Once an outstanding debt has been repaid, the system would remove the card identifier from the black list. Unfortunately, the security of this scheme may be thwarted by a generic bankcard that is reprogrammed prior to each use such that it had different account information. A black list approach alone may be ineffective if such a generic bankcard is used.

Another method maintains a white list. In accordance with the current invention, a white list contains card information for each card pre-validated or pre-registered for the system. A system using cards that are validated before a first use substantially reduces the business risk inherent with the black list system describe above, in which a card is black listed after the offending transaction(s) have already been approved by the payment terminal. The fact that a bad card cannot be detected until after an initial presentation may be a bigger problem than immediately obvious.

Pre-registration forces an additional step, which inhibits the consumers in making a purchase. To maintain consumer convenience, a black list system may further include heuristic checks to assist in preventing severe fraud. Heuristic checks are particularly suited to contactless credit cards. Such a heuristic security scheme may measure and score a large number of secondary indicia. Such indicia could include: (1) any card identifiers, such as Card Holder Name, Account Identifier, Chip Model, Chip Serial Number, Chip Manufacturer Identifier; (2) make and version of the Card Operating System of the Smart Card if any (e.g., Open Platform or MULTOS); (3) transaction flow, including overall transaction time (e.g., whether or not prolonged pauses are experienced in a particular step of the transaction, or whether or not any step performs slower or faster than expected); and/or (4) CVC1/CVC3 checking (note that even though the card verification code might not be verified in an off-line environment, it may be stored for later validation, leading to the black listing of a card if it does not clear; also note that for a CVC1 or if the CVC3 is determined to be static, it may be used in future validations).

These measurements may be scored by any of a plurality of algorithms, some specific to a measurement or class of measurements. The overall score may be compared to a preset threshold to determine whether the transaction will be accepted or not. Such scoring algorithms could include the following: (1) change of static indicia (e.g., whether or not any of the card's static attributes change, such as the identifiers, the card operating system or the expiration date; note that provisions may be made for replacement cards, where replaced cards must be rejected and a velocity check must be performed on the number of new cards per card holder); (2) duplicate unique attributes (e.g., whether or not another card has an identical attributes, even though it is supposed to be unique; examples of unique attributes include the account number or card serial number; note that a special case to consider includes where cardholders shares an account, so that their cards have the same card number); (3) black and white lists (e.g., whether or not a card is marked as inactive in a negative list or the card is marked as active in a positive list); and/or (4) time series analysis (e.g., whether or not a time series analysis of a measurement's past results indicate that the current result is unexpected; note that such time series analysis ranges from simple statistics such as a velocity check (for example, "no more than 3 authentications per minute") to advanced usage pattern analysis such as geographical location checking (for example, "if last transaction occurred more than 120 miles away and within an hour, then it cannot be valid.")).

In either approach (i.e., a pre-registration system using a white list or post-validation system using a black list), the bankcards function primarily as identifying tokens until the total charge is computed on a back-end fare processor.

Conceptually, such a fare processor may be situated between the payment terminals and the acquirer. The fare processor receives records of all bankcards that are presented to the payment terminals. The fare processor also computes a final charge due when desirable (e.g., after a sufficient number of presentation records have been received) and may retroactively correct charges when additional records indicate that the rider was overcharged or undercharged. These computations and corrections are necessary to account for complex fare products such as those involving transfers or interregional travel. For this purpose, the fare processor may have access to an historical database in which past bankcard presentations are recorded, including purchases of time, distance and ride-based passes, as well as other related information, such as age of a rider (for age discounts), linkage to multiple cards belonging to a single person and/or linkage to transit benefit accounts.

Bankcards are a natural choice of identifying token for mass transit because they are widely available and are intrinsically linked to a credit account and/or a debit account. Still, an off-line payment system may be designed to use other identifiers, such as a government ID (e.g., driver's license) or proprietary tokens (e.g., a Mobil Speedpass™). In cases where such a token is not intrinsically linked to a credit or debit account, that link may be established, for example, through a website, via the phone or over the counter.

Conversely, bankcards can be used as identifying tokens, even if no payment is due. For example, a bankcard may be used for file retrieval (e.g., in the medical field), for building access, for information access, for age verification and/or for check out purposes in a public library. Using a credit card for access control has the added advantage that stealing a credit card might be a felony, while stealing a non-credit card dedicated identifier might not be a felony.

In addition to using a bankcard in a mass transit system (for example, a system having payment terminals embedded in subway gates or at fare boxes) as described above, other domains may use such off-line credit card terminals. For example: (1) purchases while being transported (e.g., in a plane, train, ship such as meals, entertainment, vending purchases and communications access fees); (2) donations to government programs (e.g., to parks and clean highway programs); (3) purchases at campgrounds (e.g., services, boat rental, firewood and trail access); (4) payment for municipal services (e.g., parking meters, garbage depots, swimming pools); (5) charity and gifts (e.g., by way of street solicitation with branded and trusted portable units); (6) purchase from street, beach, and stadium vendors (e.g., for hot dogs, ice cream, beverages or entertainment); and (7) other off-the-grid sales (e.g., fairground kiosks, food delivered to home, bicycle couriers, concerts, etc.).

Contactless payments using a contactless bankcard are particularly suitable for use in the aforementioned applications of off-line terminals. The ISO (the International Organization for Standardization) and IEC (the International Electrotechnical Commission) have formed a specialized system for worldwide standardization including the ISO/IEC 14443 standard. The ISO/IEC 14443 standard, which is a four-part international standard for Contactless Smart Cards, specifies physical characteristics of proximity cards operating in close proximity with a reader antenna. The ISO/IEC 14443 standard is the basis for the American Express® ExpressPay, Chase blink, MasterCard PayPass® and Visa Contactless implementations. Advantageously, such systems using contactless payment readers require very little maintenance and may be made more vandal resistant than contact-type readers. Also, a contactless card does not make use of a card's magnetic stripe, which may otherwise wear out relatively quickly with frequent use (e.g., when used twice a day to pay for the subway) in a contact-type system. Contactless cards further provide additional benefits that are unavailable with magnetic stripe cards (e.g., it is possible to gain exit data in a transit system).

Many mass transit systems require the presentation of a payment token upon entry, but only some require the presentation on exit of the system or vehicle. To facilitate the gathering of rider ship statistics, which are vital in deciding where to make the capital investments, an antenna may be installed near an exit (e.g., in the ground underneath gates, or in the floor of a bus exit) to collect exit information without explicit presentment of the card by the rider. At the exit as the card holder walks over the antenna, the card holder's cards are read. In some environments, not every card would be successfully read, for example, because the reader may be working far outside the ISO 14443 specification. As a result, the information gathered may suffice for statistical purposes.

FIG. 1 shows a transit system network 10 with an associated processing system 300 and various components, in accordance with embodiments of the present invention. Transit system network 10 includes bankcard terminals 200. Bankcard terminals 200 provide a front-end interface to bankcards. A bankcard terminal 200A may take the form of a turnstile at a gate in subway system. Alternatively, a bankcard terminal 200A may be used on a transit system incorporating a self-policing or honor system (i.e., a passenger may enter into the transit system without being physically gated by a turnstile; the passenger voluntarily provides his or her bankcard to the bankcard terminal 200A; in this case, gating may simply be provided by an audio and/or visual indicator, which requires the passenger to honor). A bankcard terminal 200B may be integrated into a bill or coin collection terminal on a bus. A bankcard terminal 200C maybe a handheld device used by a conductor in a train. Collecting information from each of the bankcard terminals 200 is a processing system 300. Processing system 300 may interface to a bankcard terminal via a wired connection or a wireless connection. The interface may provide a real-time connection, such as a dedicated wire between a turnstile at a gate and processing system 300. Alternatively, the interface may provide be an intermittent connection, such as a wireless connection. In some cases, a connection between a bankcard terminal 200 and processing system 300 may be made after a long period of service. For example, at the end of the day the connection may be made between a bankcard terminal 200B in a bus when the bus retires to the garage or a handheld bankcard terminal 200C is brought back to the station.

Processing system 300 may also include one or more interfaces to a registration system 500 and a bankcard verification system 600. Registration system 500 provides a back-end interface to bankcards. A bankcard holder may register a bankcard with processing system 300 via a web interface, using an interactive voice response (IVR) system, at a interactive kiosk or using a vending machine. Bankcard verification system 600, such as settlement and clearing networks used by credit card companies, verify that a bankcard is a currently valid bankcard.

Figure 2A:
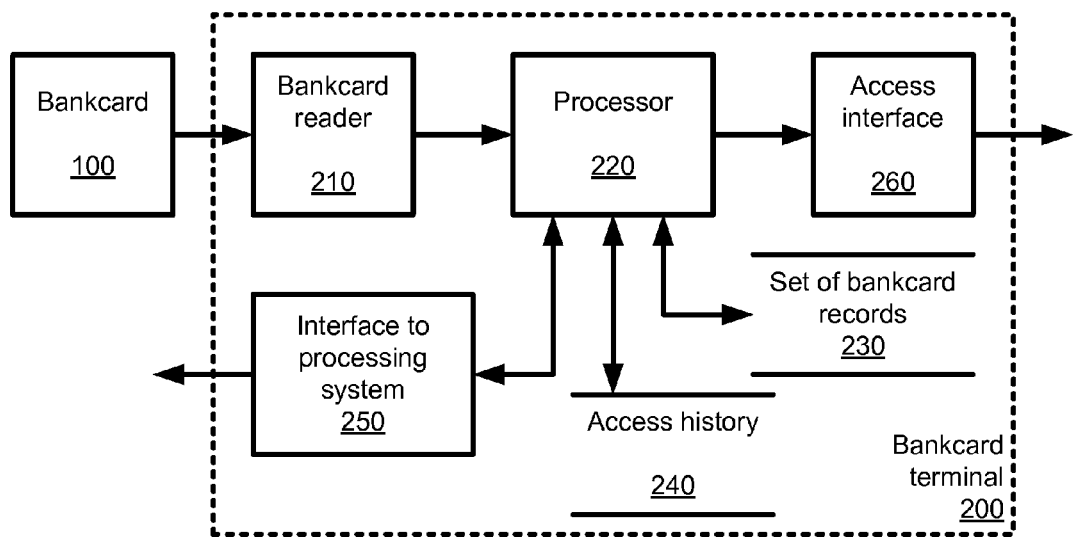
FIG. 2A shows a bankcard terminal, in accordance with embodiments of the present invention.

FIG. 2A shows a bankcard terminal 200, in accordance with embodiments of the present invention. Bankcard terminal 200 includes a bankcard reader 210, a bankcard terminal processor 220, memory to hold a set of bankcard records 230 and access history 240, a first interface 250 to a processing system 300, and a second interface 260 to assist in gating access.

In some embodiments, bankcard reader 210 provides a physical, electromagnetic, optical, magnetic, and/or radio frequency (RF) interface to bankcards 100. Bankcard reader 210 may be a receiver without a transmitter or may include both a receiver and transmitter to communicate with a bankcard 100. A bankcard may transmit bankcard data including: (1) a cardholder's name; (2) a bankcard number (e.g. a PAN as defined in ISO/IEC 7812); (3) an expiration date; (4) security data (e.g., the result of a cryptographic operation based on one or more cryptographic keys stored in the card's memory); (5) issuer private data; and/or (6) records or summaries of past transactions.

In some embodiments, bankcard reader 210 simply reads data from bankcard 100 as bankcard 100 passes by it. In some embodiments, bankcard reader 210 transmits a signal to bankcard 100 to access bankcard data. Bankcard reader 210 forwards selective bankcard data or all bankcard data received to bankcard terminal processor 220.

Bankcard terminal processor 220 includes a first interface 250 to a processing system 300 and a second interface 260 to assist in gating access, as well as an interface to memory. Bankcard terminal processor 220 may be implemented with a microcontroller, a microprocessor and/or other logic circuitry. Bankcard terminal processor 220 reads, writes and updates data in memory, such as the set of bankcard records 230, which contains a set of known bankcards, and an optional access history 240, which keeps a history of bankcards presented to bankcard terminal 200 and may be used for billing. The set of bankcard records 230 and access history 240 may be in the form of one or more sequential lists, tree structures, sorted data structures and/or databases, which may be indexed or searchable by an identifier such as a hash value or a credit card number of a bankcard. The set of bankcard records 230 may be presorted for faster subsequent searching. The set of bankcard records 230, access history 240 and identifiers are described in more detail below.

First interface 250 provides an interface to a processing system 300. Interface 250 may be a dedicated interface providing a continuous connection between terminal bankcard 200 and processing system 300. Alternatively, first interface 250 provides for periodic or intermittent connectivity to processing system 300. The link between first interface 250 and processing system 300 may be wired or wireless.

Second interface 260 provides an interface to assist in regulating access. To assist in regulating access, in some embodiments second interface 260 may activate a barrier or gate while in another embodiments second interface 260 may simply activate a red or green light either observable by a conductor, gate operator and/or the commuter. Second interface 260 may provide a signal to open the turnstile. Second interface 260 may provide a signal to activate an audio and/or visual announcement. For example, second interface 260 may send a signal to an LCD display or and LED in a handheld unit that is observed by a conductor.

Figure 2B:
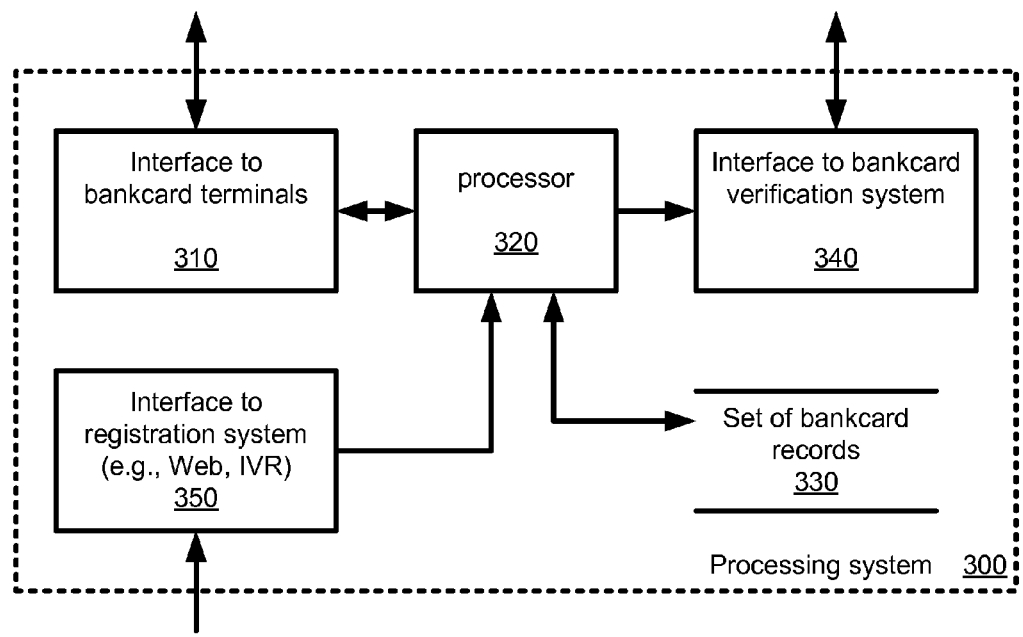
FIG. 2B shows a processing system, in accordance with embodiments of the present invention.

FIG. 2B shows a processing system 300, in accordance with embodiments of the present invention. Processing system 300 is associated with one or more transit systems and may be part of or separate from the transit systems. Processing system 300 includes a first interface 310 to communicate with one or more bankcard terminals 200, a processor 320, memory, a second interface 340 to communicate with a bankcard verification system, and a third interface 350 to communicate with a bankcard registration system.

Processor 320 is coupled to and communicates with first, second and third interfaces 310, 340 and 350, respectively. Processor 320 is also coupled to memory and manipulates a set of known bankcards 330 held in the memory. The set of known bankcards 330 may contain bankcard data (such as a bankcard number, usually a PAN and/or a PAN alias as described below) or one or more hash values computed from the bankcard data. Processor 320 may be implemented with a microcontroller, a microprocessor and/or other logic circuitry.

The set of bankcard records 330 contains an identifier of each bankcard in the set. The bankcard 100 may be one that was previously presented by a respective holder of the bankcard 100 to processing system 300 and verified by processing system 300. A presentation may be by way of a physical presentation by the holder at a bankcard terminal 200 at a gate or entrance of a transit system. Alternatively, the presentation may be by way of registering the bankcard 100 over the telephone, for example, using an IVR system, or by way of registering using the Internet, for example, using a web browser. Alternatively, the presentation may be by a bank or other financial institution enabling the bankcard by communicating with processor 320. Such a financial institution may provide multiple presentations to processing system 300 individually or in a batch process.

At a bankcard terminal, bankcard data received via a magnetic stripe may differ from that received over the air through an RF connection, which may differ still from bankcard data received via a registration system. For example, bankcard data may contain a Primary Account Number (PAN), which is typically a 15-digit to 16-digit numeric code embossed on the face side of a bankcard, and which is also encoded in the magnetic stripe. PAN is further defined in ISO/IEC 7811 and ISO/IEC 7812. The PAN standard allows up to 19 digits. The PAN standard allows for three main components in the form nnnn nndd dddd ddds where: (1) nnnn nn is the Issuer Identification Number (IIN) (typically six digits); (2) dd dddd ddd is the NIH ID number or individual account identification (IAI) (up to twelve digits) without the check digit; and (3) s is the ISO/EIC 7812-1 check digit. A bankcard having a wireless chip may be coded with a different identifying number than the PAN. For example, when a bankcard communicates with an RF reader, it will send an alias or ghost of the PAN rather than the PAN itself. The PAN alias may need to be mapped to a PAN for further processing. Not all bankcards are in full compliance with aforementioned standards (e.g., some do not use a check digit). Some embodiments of the present invention operate with bankcards compliant with these PAN ISO/IEC standards while other embodiments operate with non-compliant bankcards not compliant to the PAN ISO/IEC standards. Still other embodiments of the present invention operate with a family of compliant and non-compliant bankcards.

If a bankcard is expected to provide different identifying data (e.g., PAN alias) rather than the credit card number (e.g., PAN), the bankcard terminal 200, processing system 300, verification system or the like will provide a translation between the alias PAN and the PAN. In some cases, the set of bankcard records 230 in the bankcard terminal 200 contains a PAN, an alias PAN, a hash value based on the PAN, and/or a hash value based on the alias PAN. In some cases, the set of bankcard records 330 in the processing system 300 contains a PAN, an alias PAN, a hash value based on the PAN, and/or a hash value based on the alias PAN.

As stated above, the set of bankcard records 230 may be presorted for faster subsequent searching. For example, the set of bankcard records 230 may be stored as a self-balancing tree. In some embodiments, a bankcard identifier is determined using the Issuer Identification Number (IIN) and the individual account identification (IAI) without the check digit. The check digit is not included in the determined bankcard identifier because it is simply a checksum value and does not provide any additional identification. In some embodiments, the determined bankcard identifier includes the individual account identification (IAI) and the record is stored together with other determined bankcard identifier having the same Issuer Identification Number (IIN). In these embodiments, a first lookup will search for the IIN and a second lookup will subsequently search for the IAI. In some embodiments, the IIN is used for the first search and a hash value is created and used for the IAI. In other embodiments, a first hash value is created for the IIN and a second hash value is created for the IAI. These embodiments provide for both compact storage and sufficient speed. Some embodiments require that the time between bankcard presentation by a cardholder and granting or denying access be within 200 milliseconds. Therefore, a search of the set of bankcard records 230 should be complete within 200 milliseconds.

Interfaces 310, 320 and 340 may share a common physical interface, for example, the physical interface maybe an Ethernet connection to the Internet and/or an intranet. In this case, interfaces 310, 320 and 340 share a common physical interface but are logically three different interfaces. For example, interfaces 310, 320 and 340 may each have a unique socket identifier.

Figure 3:
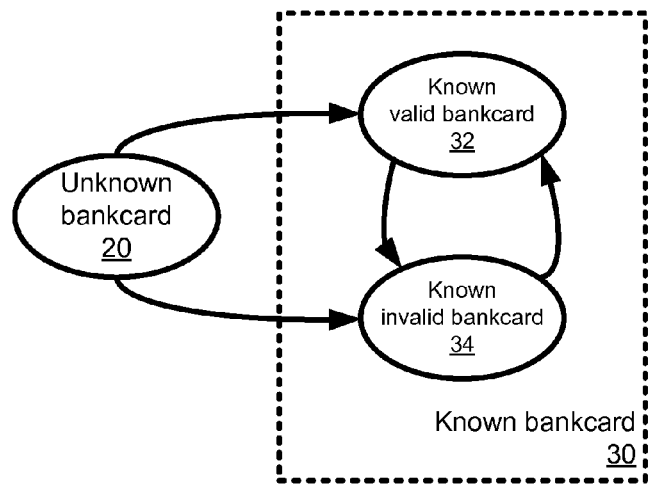
FIG. 3 illustrates a state diagram, in accordance with embodiments of the present invention.

FIG. 3 illustrates a state diagram, in accordance with embodiments of the present invention. Bankcards may be considered to be in one of two classifications: an unknown bankcard 20 or a known bankcard 30. An unknown bankcard 20 represents a bankcard that has not been presented by a respective holder of the bankcard. Thus, the set of bankcard records 230 (in FIG. 2A) and the set of bankcard records 330 (in FIG. 2B) will now have an identifier for the unknown bankcard 20.

When an unknown bankcard 20 is presented it becomes a known bankcard 30. A known bankcard 30 may also be considered to be in one of two classifications: a known valid bankcard 32 or a known invalid bankcard 34. A known valid bankcard 32 represents a bankcard that has been presented by a respective holder of the bankcard as well as verified with a bankcard verification system 600. A known invalid bankcard 34 represents a bankcard that has been presented by a respective holder of the bankcard 100; however, verification with a bankcard verification system 600 has failed in some respect. For example, bankcard terminal 200 or processing system 300 was unable to communicate with bankcard verification system 600. Alternatively, bankcard terminal 200 or processing system 300 communicated with bankcard verification system 600, which indicated bankcard 100 is somehow the invalid for a purchase. A known valid bankcard 32 may transition to a known invalid bankcard 34, for example, if an attempt to clear and settle a transaction fails. Similarly, a known invalid bankcard 34 may transition to a known valid bankcard 32, for example, if an attempt to verify or to clear and settle a transaction completes successfully.

Figure 4:
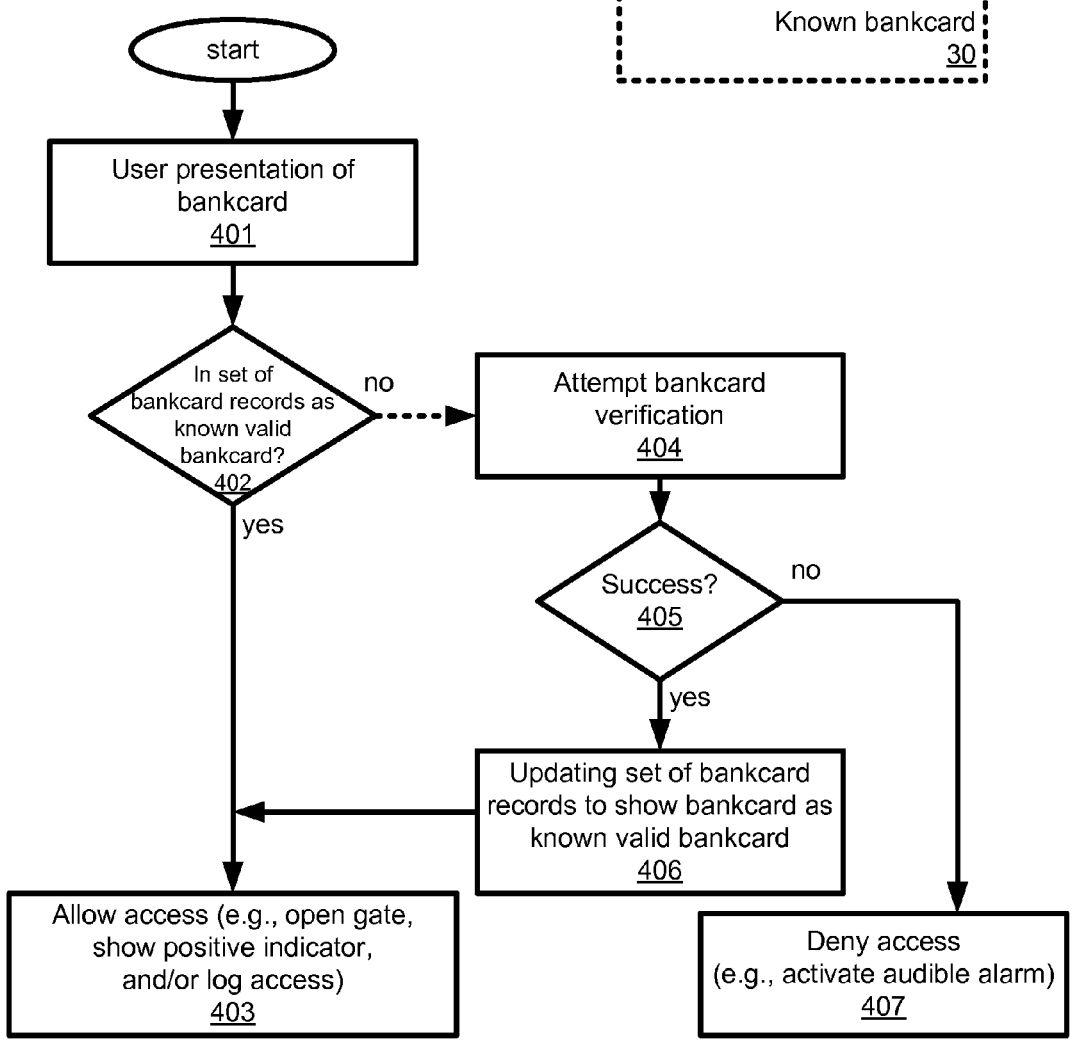
FIG. 4 represents a flowchart implementation for operations in a bankcard terminal, in accordance with embodiments of the present invention.

FIG. 4 represents a flowchart implementation for operations in a bankcard terminal 200, in accordance with embodiments of the present invention. In 401, a respective holder of a bankcard 100 presents the bankcard to a bankcard terminal 200 for access to a transit system. Bankcard terminal 200 reads, from the bankcard, bankcard data including a bankcard identifier. Bankcard terminal 200 determines an identifier, such as a credit card number read from the bankcard data or by computing a hash value based on the bankcard identifier.

A bankcard terminal 200 may receive bankcard data from one or more of several paths. First, a bankcard terminal 200 may receive bankcard data directly from a bankcard's magnetic stripe (e.g., a bankcard holder may pass a magnetic stripe of a bankcard 100 through a magnetic stripe reader on the bankcard reader 210). Second, a bankcard terminal 200 may receive bankcard data via an RF connection between the bankcard terminal 200 and the bankcard (e.g., a wireless chip in a bankcard 100 may communicate with a radio transceiver in a bankcard reader 210). Third, a bankcard terminal 200 may receive bankcard data directly from electronic contacts to a smart chip on the bankcard. Fourth, bankcard terminal 200 may receive bankcard data from a processing system 300, which previously received bankcard data from an external connection (e.g., IVR system, Internet/web interface, and/or financial institution and/or one or more agents of financial institutions). After receiving and processing bankcard data received from an interface to a registration system 350, the processing system 300 may send bankcard data to a bankcard terminal 200 through its interface 310.

A hash function may be used to compute a hash value from the bankcard data. A hash function or hash algorithm is a reproducible method of turning bankcard data into hash data that may serve as a digital fingerprint of the bankcard data. The hash function may be considered to chop and mix (i.e., substitutes or transposes) the data to create such a fingerprint. The fingerprint may be called hash sums, hash values, hash codes or simply hashes. The hash computation may be based on a cryptographic hash function. Broadly speaking, a cryptographic hash function behaves like a random function while still being deterministic and efficiently computable.

In 402, bankcard terminal 200 uses the determined identifier to tell whether or not the bankcard is contained in a set of bankcard records and whether or not the bankcard is a known valid bankcard. In some embodiments of bankcard terminal 200 that have an interface to a bankcard verification system 600, an attempt is made to verify the bankcard at 404. At 405, bankcard terminal 200 determines whether or not the bankcard was successfully verified. At 406, if the bankcard was successfully verified, the set of bankcard records 230 is updated with the determined identifier for the currently presented bankcard. At 407, if the verification was unsuccessful, access is denied, for example by not opening a gate and/or by activating an audio and/or visual indicator to the bankcard holder and/or to a conductor. At 403, if the determined identifier was already in the set of bankcard records 230 as a known valid bankcard or was added to the set of bankcard records (at 406), access to the transit system is allowed, for example, by opening the gate and/or by activating an audio and/or visual indicator to the bankcard holder and/or to a conductor.

Figure 5A:
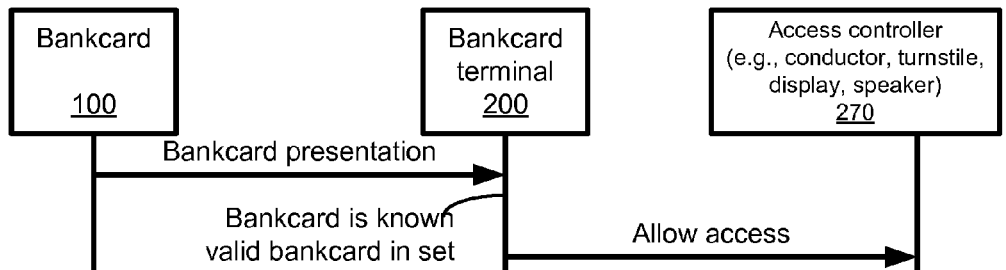
FIGS. 5A, 5B and 5C show message flow between network components, in accordance with embodiments of the present invention.
Figure 5B:
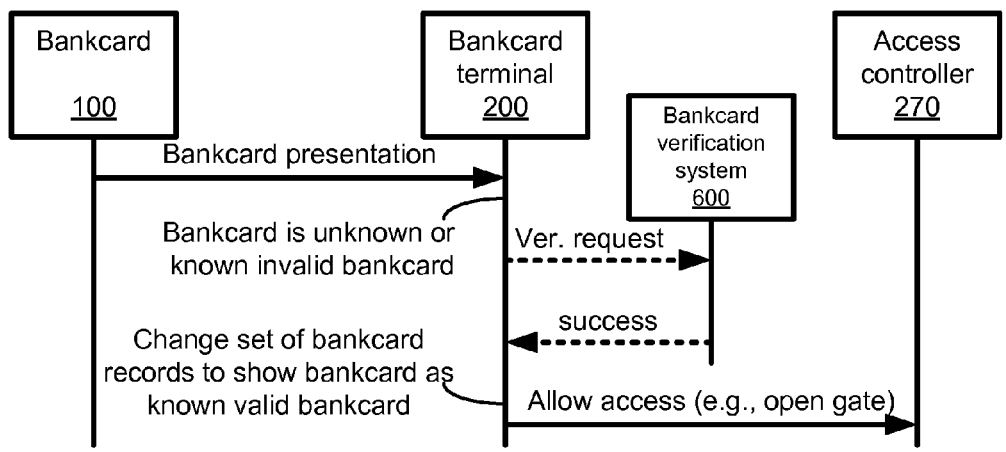
Figure 5C:
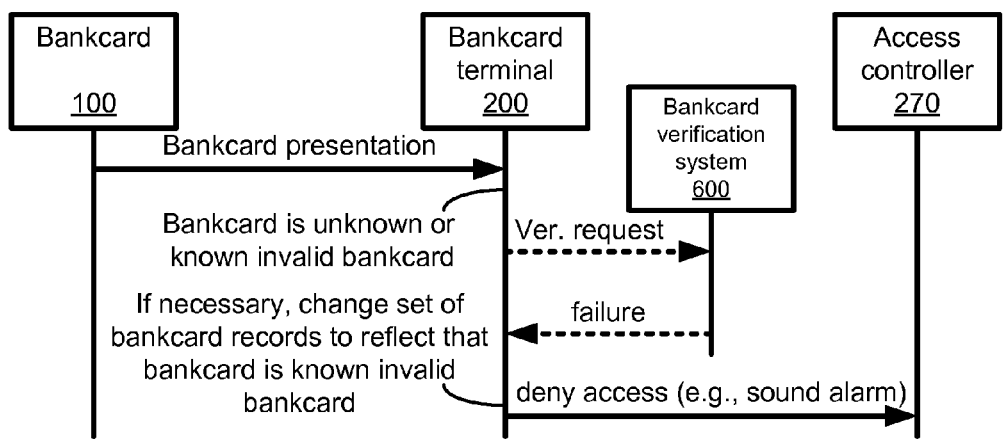

FIGS. 5A, 5B and 5C show message flow between network components, in accordance with embodiments of the present invention. In FIG. 5A, a bankcard 100 is currently presented by a bankcard holder (e.g., a subway commuter or bus rider). Bankcard reader 210 in bankcard terminal 200 receives bankcard data comprising data from the bankcard currently presented. Bankcard terminal processor 220 in bankcard terminal 200 determines an identifier (e.g., a hash value or a credit card number) of the currently presented bankcard. Next, bankcard terminal processor 220 uses the determined identifier to tell that the currently presented bankcard is contained in the set of bankcard records 230. Bankcard terminal processor 220 signals second interface 260 to communicate with the access controller 270. Access controller 270 maybe, for example, a conductor, a gate of the turnstile or a bus driver or other human providing oversight or control.

To assist in gating access, in some embodiments second interface 260 may activate a barrier while another embodiments second interface 260 may simply the activate a red or green light either observable by a conductor, gate operator and/or the commuter. Second interface 260 may provide a signal to open the turnstile. Second interface 260 may provide a signal to activate an audio and/or visual announcement. For example, second interface 260 may send a signal to an LCD display or an LED in a handheld unit that is observed by a conductor.

In FIG. 5B, bankcard terminal 200 may have real-time access to bankcard verification system 600. If the bankcard is unknown, bankcard terminal 200 may attempt to validate the bankcard with bankcard verification system 600. The bankcard terminal 200 may receive a PAN (or alternatively an alias PAN as described above), which it uses to identify the bankcard to the bankcard verification system. If successful, bankcard terminal 200 allows access and update the set of bankcard records 230 to show the currently presented bankcard is a known valid bankcard. In FIG. 5C, bankcard terminal 200 fails to successfully validate the bankcard. In this case, access is denied, for example, by sounding alarm and/or not opening a gate.

Figure 6:
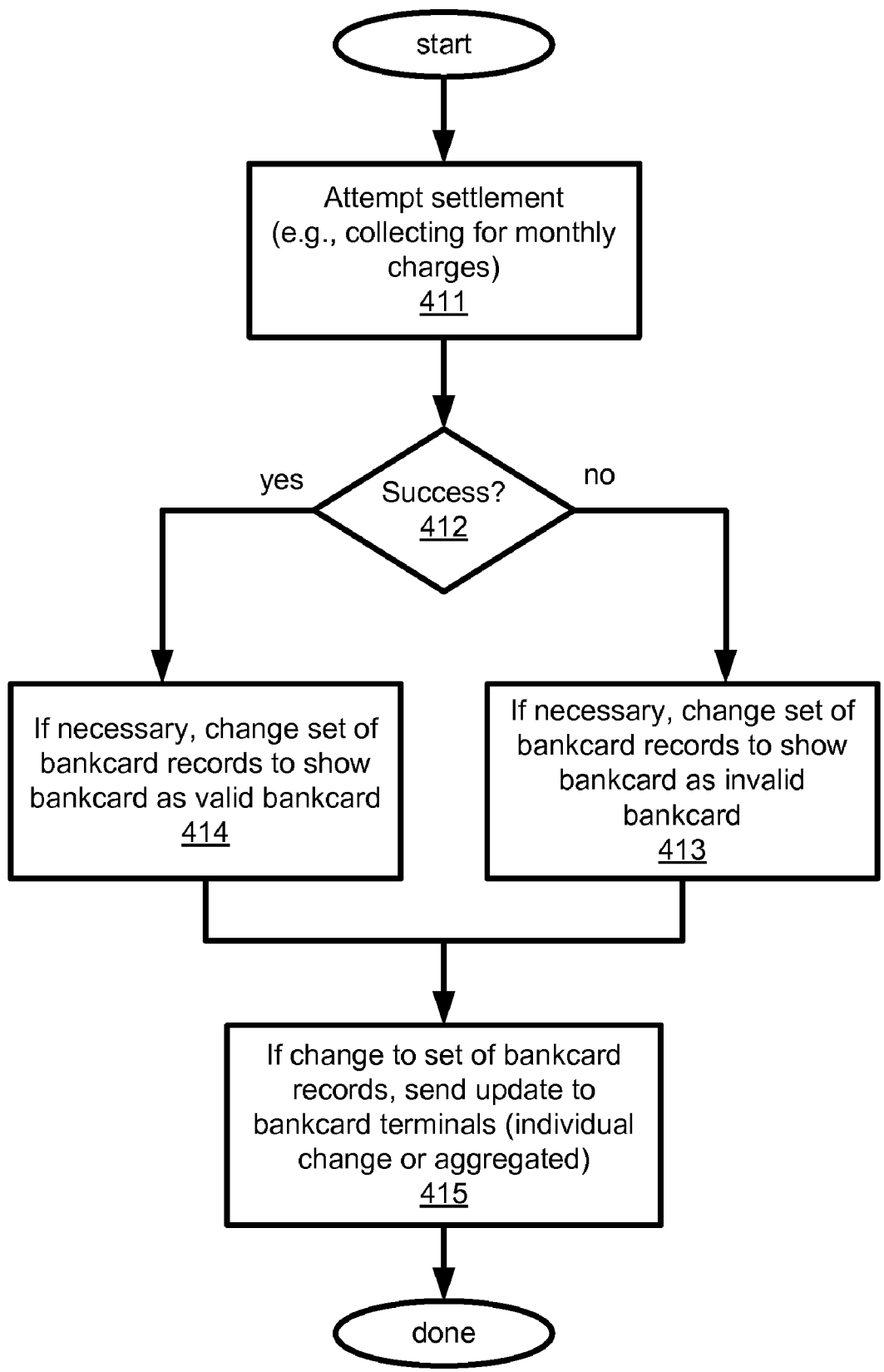
FIGS. 6 and 7 represent flowchart implementations for operations in a processing system, in accordance with embodiments of the present invention.
Figure 7:
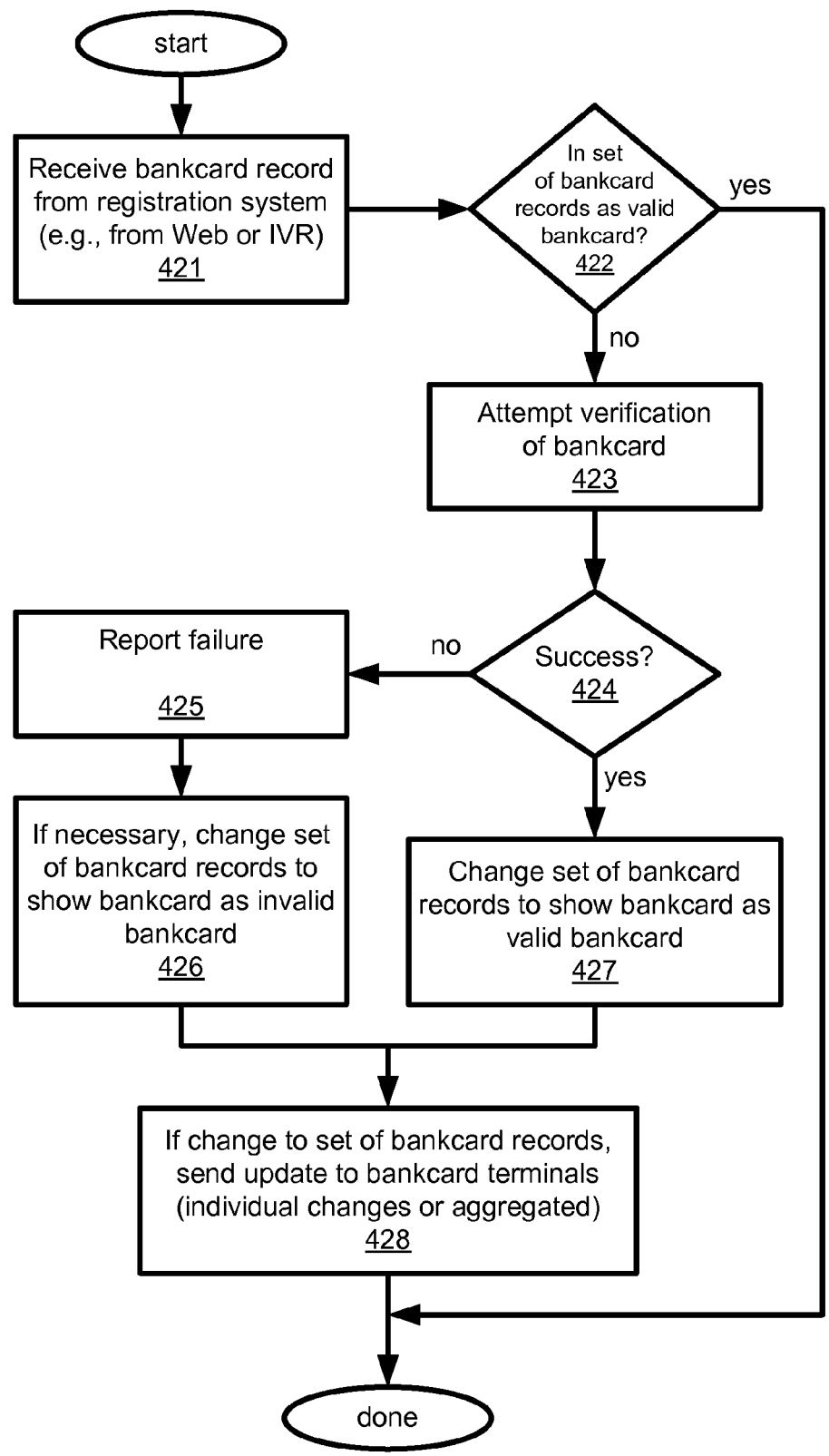

FIGS. 6 and 7 represent flowchart implementations for operations in a processing system, in accordance with embodiments of the present invention. In FIG. 6, at 411, processing system 300 attempts settlement, for example, to collect for monthly charges. At 412, a determination is made whether the attempt was successful. At 413, if the attempt was unsuccessful, the set of bankcard records 230 may be updated to indicate the bankcard is now invalid. At 414, if the attempt was successful, the set of bankcard records 230 may be updated to indicate the bankcard is valid. At 415, if changes are made to the set of bankcard records 230, an update may be provided to each bankcard terminal. The update may be provided as a new set of bankcard records 230 that the bankcard terminal will use as a replacement set. Alternatively, the update may be provided as incremental changes to the existing set.

FIG. 7, at 421 to 428, shows a process to register bankcards with a back-end through a web interface, kiosk, telephone or other interactive system such as used by a financial institution. Through the registration process, a processing system 300 associated with a set of transit systems including at least one transit system maintains a set of bankcard records.

At 421, a processing system 300 receives, from a bankcard registration system through its interface 350 to the registration system, a registration request. The registration request is a request by the remote bankcard holder or by a financial institution or its agent to register the bankcard with the processing system 300. By pre-registering the bankcard, future regulation of entry or access to any of the set of transit systems may be more quickly performed, for example, because a remote bankcard terminal 200 will not need to perform an authorization or clearing and settlement request with a distant bankcard verification or clearing and settlement system. The registration request contains bankcard data of a bankcard presented by a respective holder of the bankcard. The bankcard data may include an identifier of the bankcard such as the PAN or credit card number. Next, the processing system 300 determines an identifier of the presented bankcard. This determined identifier of the presented bankcard may be used as an index to a database or lookup table and may be a PAN or a credit card number or derived from the PAN or credit card number such as through a hashing function.

At 422, the processing system 300 determines whether the determined identifier is contained in a set of bankcard records. The set of bankcard records includes identifying information of bankcards that were previously presented to the processing system 300. These previously presented bankcards include bankcards from a plurality of issuers. For example, the set contains at least one bankcard from a first issuer (e.g., Chase®) and at least one bankcard from a second issuer (e.g., American Express®). The plurality of issuers may contain two or more issuers including, for example, Chase, American Express, Citi®, Bank of America®, Discover®, MasterCard®, Visa® and the like. The set contains a number of values for each bankcard including an identifier of a bankcard previously presented to the processing system. This identifier in the set may be searchable and may be used by the processing system 300 when determining whether the determined identifier is contained in a set of bankcard records.

At 423, the processing system 300 attempts to verify the bankcard through a bankcard verification system. The attempt to verify the currently presented bankcard with the bankcard verification system may include attempting to verify the currently presented bankcard with a clearing and settlement network. Alternatively, the attempt to verify the currently presented bankcard with the bankcard verification system may include receiving an authorization, from a clearing and settlement network, for an amount of funds from an account linked to the currently presented bankcard. In some circumstances, the attempt to verify the currently presented bankcard with the bankcard verification system may result in a failed attempt. For example, the attempt to verify the currently presented bankcard with the bankcard verification system may result in receiving, from the bankcard verification system, an indication that the bankcard verification system rejects the authorization of a financial charge.

By verifying the bankcard, the processing system 300 determines whether the bankcard will be eligible or ineligible for a future purchase. At 424, if the verification is not successful, the processing system 300 reports this failure at 425. That is, the processing system 300 reports a failure, if attempting to verify the presented bankcard results in a determination of an invalid bankcard. At 426, if the set contains invalid or ineligible bankcards, the processing system 300 changes the set to show that the bankcard is an invalid bankcard. That is, the processing system 300 removes, from the set of bankcard records, the present bankcard, if attempting to verify the presented bankcard results in the determination of an invalid bankcard. At 424, if the verification is successful, the processing system 300 changes the set to show that the bankcard is a valid bankcard at 427. That is, the processing system 300 incorporates the presented bankcard into the set of bankcard records, if attempting to verify the presented bankcard with the bankcard verification system results in receiving an indication of a valid bankcard.

In either case at 428, if the processing system 300 made a change to the set of bankcard records, it will communicate, to at least one bankcard terminal 200, updates to the set of bankcard records. The updates may be made either individual for each received bankcard record or may be aggregated as a batch update. The update may be downloaded to a bankcard terminal 200 by an electronic data connection or may be made by physically porting a memory device (e.g., a CD-ROM or flash drive) from the processing system 300 to the bankcard terminals 200.

In some embodiments, the set of bankcard records 230 contains only bankcards presented to the system at the front-end through bankcard terminal. In other embodiments, the set of bankcard records 230 contains only bankcards presented to the system at the back-end through a registration system. Still in other embodiments, the set of bankcard records 230 contains only bankcards presented to the system at either the front-end or the back-end. In some embodiments, the set of bankcard records 230 contains only bankcards individually by a holder of the bankcard. In some embodiments, the set of bankcard records 230 contains only bankcards individually by a holder or holder's agent of the bankcard. In a sense, each of the presentations is learned by the system. In some embodiments, the set of bankcard records 230 includes bankcards presented by a financial institution, or the like, in addition to the learned bankcards.

A rules processor may be used to process bankcard records or user token data. These presentations may be processed offsite in real-time or offline individually or accumulated and processed in a batch mode. In some embodiments, a bankcard is either a debit card or a credit card. In other embodiments, a user token or identifying token is used. An identifying token may be a bankcard or other payment card or other identification (ID) card or chip in the form of a card or embedded in or on another device such as a mobile phone.

When bankcard presentations are processed offline (not in real-time), resulting user toke records, each representing a presentation, may be received by a rules processor in non-sequential order. That is, records may be received out of order and perhaps some records may be delayed by a substantial period of time.

Figure 8:
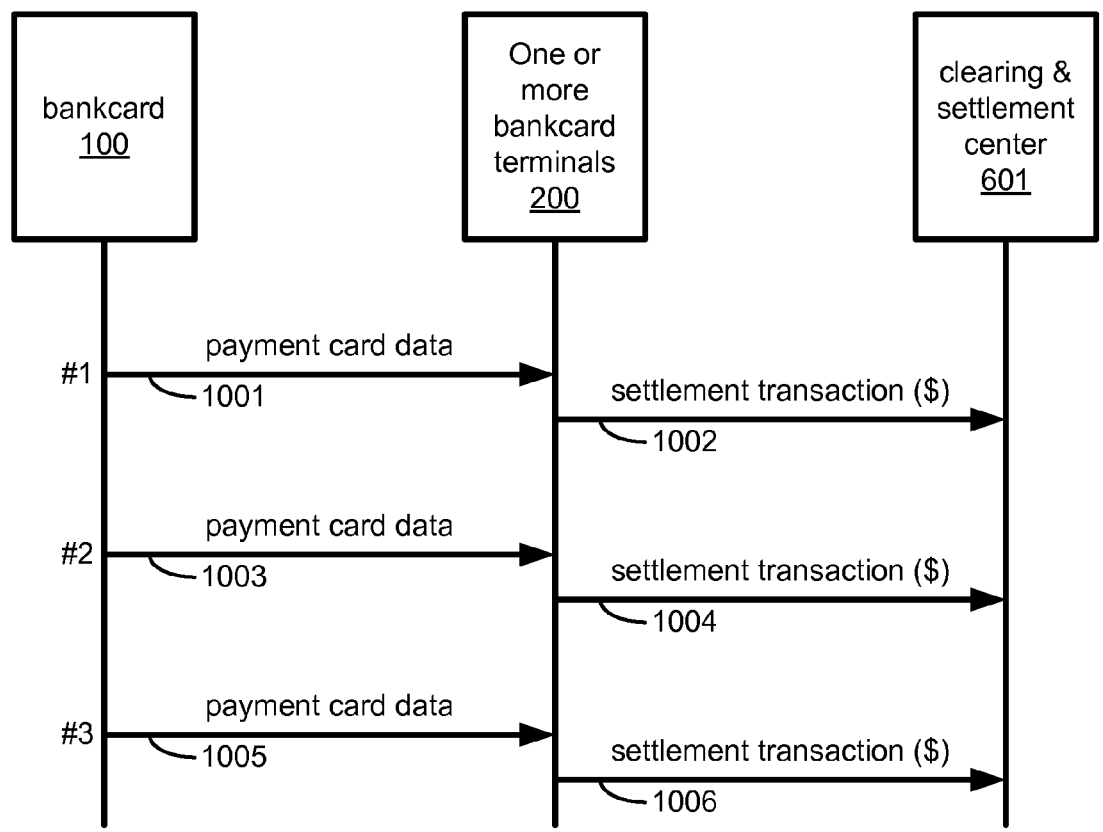
FIG. 8 shows typical processing of payment card data.

FIG. 8 shows typical processing of payment card data. A user makes a first presentation (#1) using a bankcard 100 at a first bankcard terminal 200. This first presentation causes the bankcard terminal to read payment card data 1001 from the bankcard 100 and forward settlement transaction information 1002 to a clearing and settlement center 601. The payment card data may include bankcard data such as: (1) a cardholder's name; (2) a bankcard number (e.g. a PAN as defined in ISO/IEC 7812); (3) an expiration date; (4) security data (e.g., the result of a cryptographic operation based on one or more cryptographic keys stored in the card's memory); (5) issuer private data; and/or (6) records or summaries of past transactions. Similarly, the settlement transaction information 1002 may include some or all of this data as well as a monetary amount to be settled. On a subsequent presentation (#2), the user again presents the bankcard at a second bankcard terminal 200 resulting in the second bankcard terminal 200 receiving payment card data 1003 and sending settlement transaction information 1004. A third presentation (#3), the user presents the bankcard at a third bankcard terminal 200 resulting in the third bankcard terminal 200 receiving payment card data 1005 and sending settlement transaction information 1006.

Such a system that attempts to settle each user presentation is not amicable to processing mass transit transfers or mass transit entry (tap-in) and exits (tap-outs). For example, the first presentation may be at a turnstile in a subway system and the second presentation may be at a fare box on a bus. In this case, known systems would charge two single-ride fares rather than discounting the fares. For example, the second presentation may qualify as a transfer and should cost the rider either a discounted fare or be free. A rules processor may be used to intercept the user token data and consolidate or eliminate unnecessary settlement transactions. Typically, a merchant, such as a mass transit operator, pays a fix fee and a percentage for each settlement transaction. A system that consolidates or eliminates transactions helps to reduce the total fixed fees incurred by the merchant.

Figure 9:
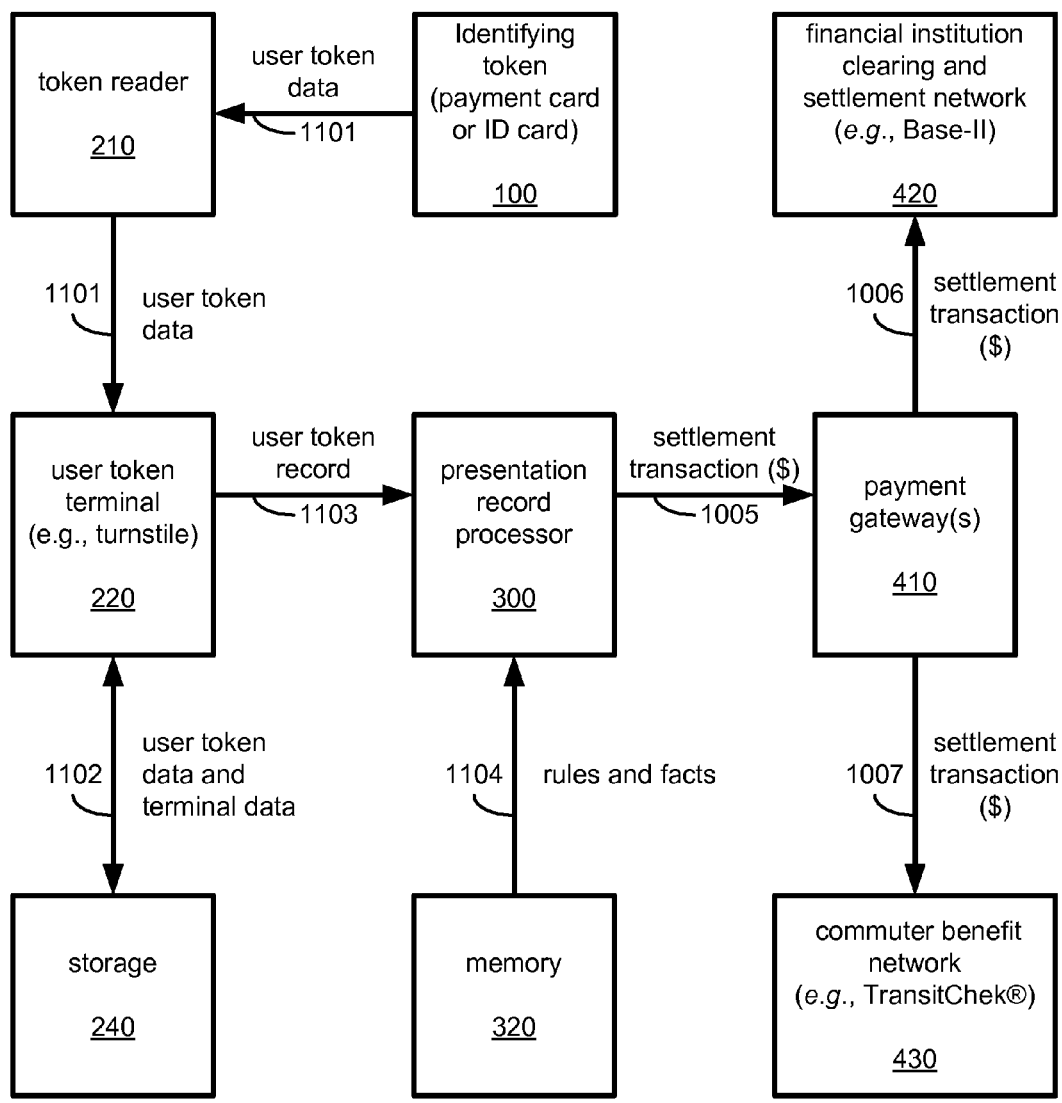
FIG. 9 shows a presentation rules processor coupled to a first interface to receive a user token record (presentation record) from a plurality of user token terminals, in accordance with embodiments of the present invention.

FIG. 9 shows a presentation rules processor 300 coupled to a first interface to receive a user token record (presentation record) 1103 from a plurality of user token terminals 220, in accordance with embodiments of the present invention. The first interface may be a TCP/IP socket or the like. The user token terminal 220 may be a turnstile, a fare box or other entry or exit gate to a public transit system. At the gate or terminal 220, a user presents an identifying token 100, such as a payment card or ID card, to a token reader 210. The token reader may be integral with or separate from the user token terminal 220. The user token terminal 220 also includes memory or storage 240 to hold the user token data 1102 as well as other terminal data.

The presentation record processor 300 is also coupled to memory 320 to hold rules and facts 1104 including the received plurality of presentation records, fare rules, and transit account data, which include an account state for a plurality of transit accounts. The memory 320 may include a database to hold a received plurality of presentation records and/or may include a rule base including distinct rules to operate on the received plurality of presentation records. The memory 320 may be separate from or integral with the processor 300. For example, the memory 320 and processor 300 may be coupled via a computer bus structure and/or via a software socket structure. The memory 320 may include a first set of data structures for the fare rules and a second set of data structures for the received plurality of presentation records, wherein the first set of data structures are distinct from the second set of data structures.

The presentation record processor 300 is coupled to a second interface 1005 to communicate to a payment gateway 410 for settling the plurality of transit accounts. Similarly, the second interface 1005 may be a computer bus. The payment gateway 410 is coupled to a commuter benefit network 430 (e.g., TransitChek®) to communicated a first set of settlement transactions 1007. The payment gateway 410 is also coupled to a traditional financial institution clearing and settlement network 420 (e.g., Base-II) to communicated a second set of settlement transactions 1006. The payment gateway 410 first settles accounts by applying funds from the commuter benefit network 430. The payment gateway 410 next settles the remaining balance with the clearing and settlement network 420.

In some embodiments, the backend processing system or presentation record processor 300 is located remotely from a plurality of gates. That is, the processor 300 is housed in a separate building from the terminals 220. In other embodiments, wherein the backend processing system or presentation record processor 300 is co-located with a plurality of gates. That is, it is located in the same open space or building as the terminals 220. In some embodiments, the system is used with a single public transit system. In other embodiments, the system is used with a plurality of public transit systems, wherein the first interface is coupled to receive a plurality of presentation records from the plurality of public transit systems.

Figure 10:
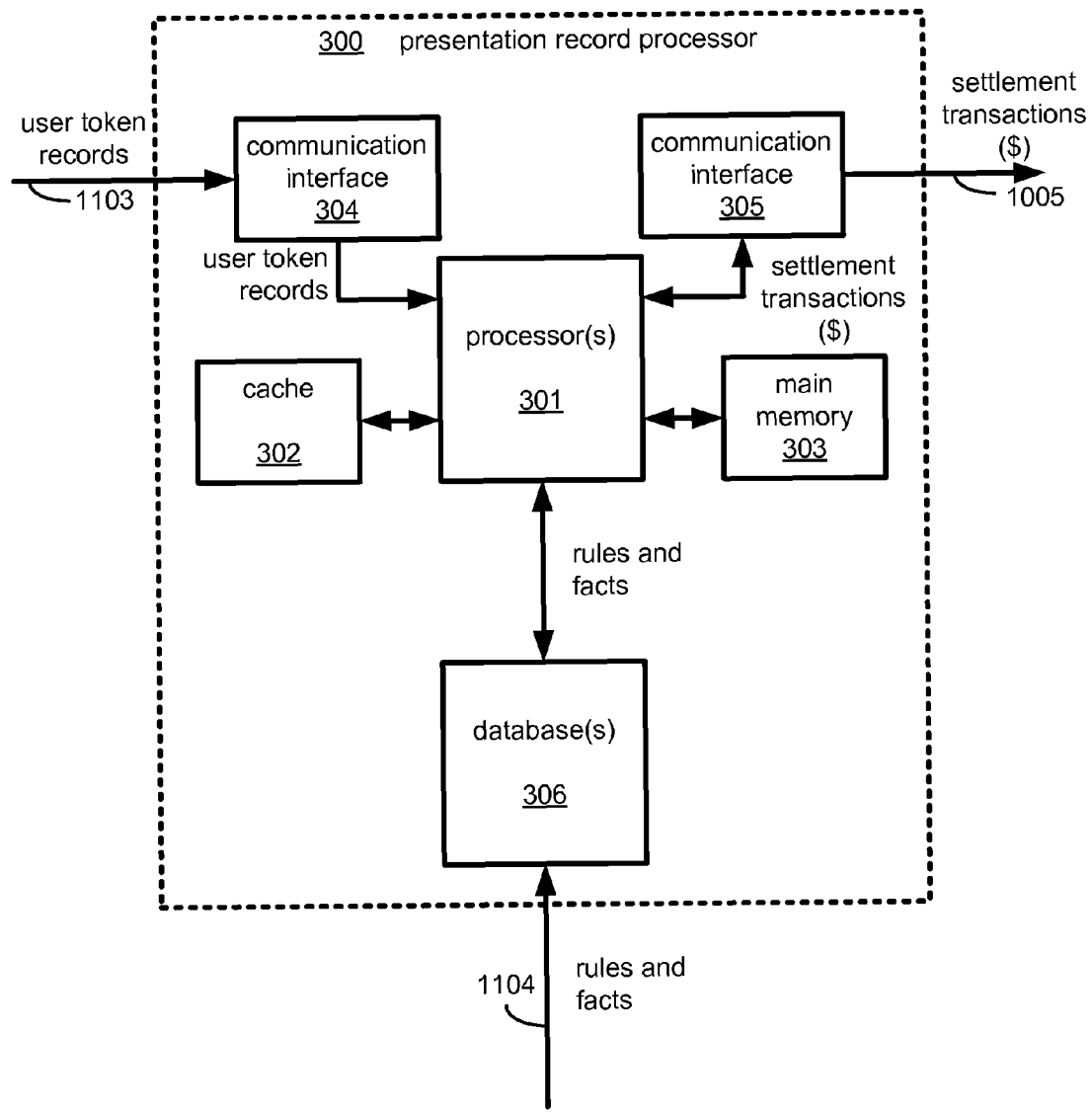
FIG. 10 shows additional detail of a presentation record processor (rules processor), in accordance with embodiments of the present invention.

FIG. 10 shows additional detail of a presentation record processor (rules processor) 300, in accordance with embodiments of the present invention. The processor 300 may comprise a processor 301 coupled a first interface (communication interface 304, which may be a TCP/IP interface, a socket or a computer bus) to accept user token records 1103 and a second interface (communication interface 305, which may similarly be a TCP/IP interface, a socket or a computer bus) to send settlement transaction data 1005. The processor 301 is also coupled to a cache 302, a main memory 303 and one or more databases 306. The memory 320 described above with reference to FIG. 9 may be incorporated into the cache 302, main memory 303 and/or the database 306. Two or more of the components described in FIG. 10 may be incorporated in to an integrated device.

Figure 11:
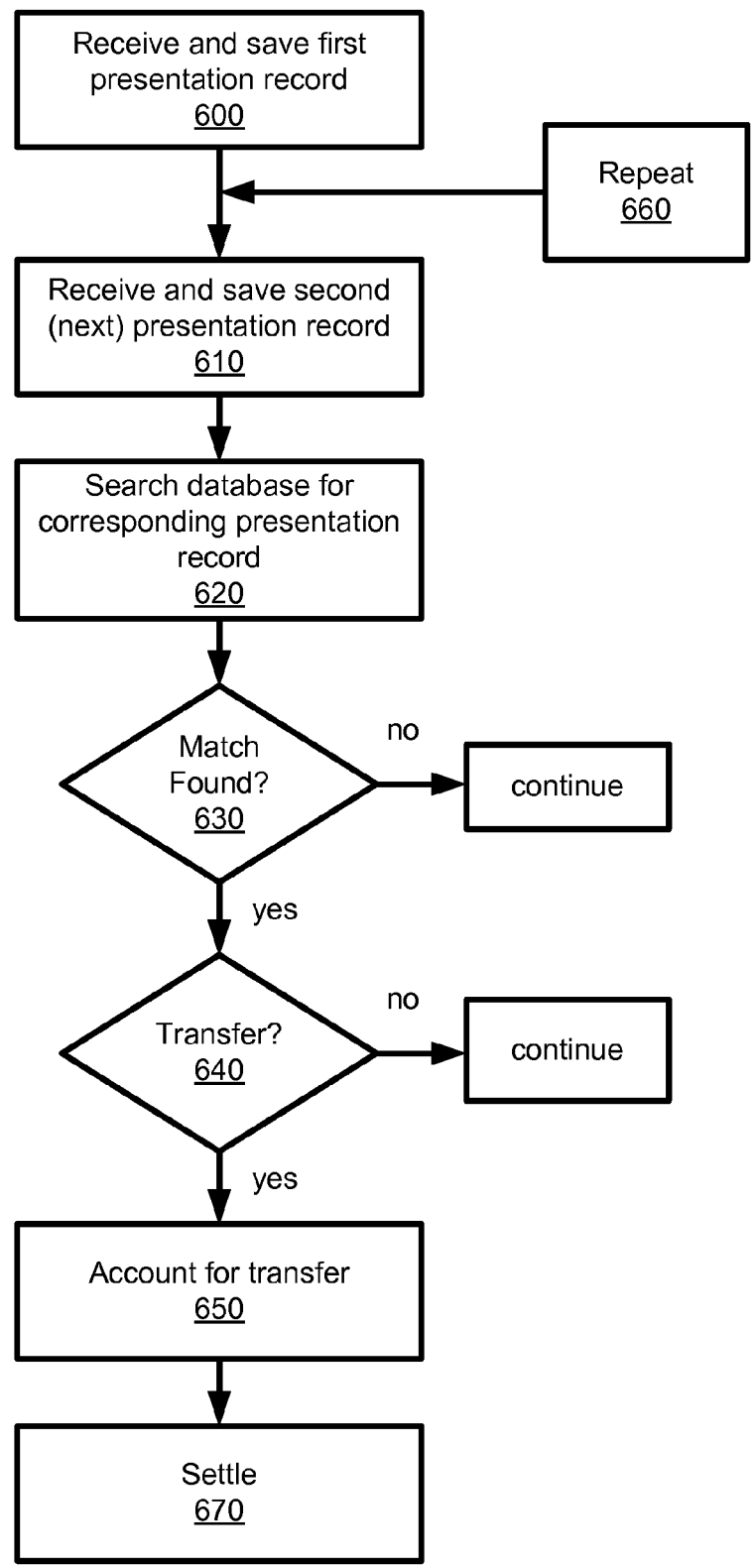
FIG. 11 shows a method to process transfer rides associated with at least one public transit network, in accordance with embodiments of the present invention.

FIG. 11 shows a method to process transfer rides associated with at least one public transit network, in accordance with embodiments of the present invention. The method may be executed on a presentation record processor 300 or rules processor. The presentation record or user token data may be formed by a token reader reading data from an identifying token. The token reader sends the user token data to a terminal 220. The terminal 220 sends a first presentation record either individually or with a plurality of presentation records representing a plurality of presentations. At 600, the first presentation record is received at the processor 300 from a gate in a transit system, such as at an entry or exit turnstile or bus fare box. The first presentation record may include a timestamp and an identifier to a transit account. The processor 300 saves the first presentation record to memory, such as in a database. The processor 300 may generate a hash identifier based on at least part an ID, such as at least part of a bankcard identifier number associated with a bankcard. In this matter, the ID is not stored in long term memory but is converted to a hash value.

At 610, the processor 300 receives and saves a second presentation record, wherein the record also includes a timestamp and an identifier to a transit account. In some embodiments, the first and second presentation records are generated by a single public transit network. In other embodiments, the first and second presentation records are generated by the same or different public transit networks. For example, both records may be from bus travel or both from rail travel. Alternatively, the first presentation record is recorded by a reader within a first public transit agency and the second presentation record is recorded by a reader within a second public transit agency. In addition, the first presentation record and second presentation record represent different modes of transportation. For example, the first presentation may represent travel on a subway and second presentation record may represent travel on a bus. Alternatively, the first presentation record may represent travel on a first train system with first public transit agency and second presentation record may represent travel on second train system with a second public transit agency. The records may be formed using a single form of identification, for example, from a common financial account. As such, the identifier in the first presentation record equals the identifier in the second presentation record. Alternatively, the identifier in the first presentation record differs from the identifier in the second presentation record. That is, a user may use different forms of identification, for example, a first credit card and a driver's license, or alternatively, the identifier in the first presentation record identifies a first bank card account and the identifier in the second presentation record identifies a second bank card account different from the first bank card account. The presentation record may include an indication of the gate's location (e.g., at a particular subway station or on a particular bus).

At 620, the processor 300 searches the database for a presentation record corresponding to the transit account identified by the identifier in the second presentation record. At 630, the processor 300 determines if a match is found. For example, a match may be found if the processor 300 evaluates a duration of time elapsing between the timestamp of the first presentation record and the time stamp of the second presentation record. Alternatively, a match may be found if the processor 300 evaluates a distance between a location associated with the first presentation record and a location associated with the second presentation record. Alternatively, a match may be found if the processor 300 evaluates a connection between a first commuter transit line associated with the first presentation record and a second commuter transit line associated with the second presentation record. If no match is found, processing may continue by waiting for a subsequent presentation record or time out.

At 640, if a match is found, the processor 300 determines whether the first presentation record and second presentation record comprise an initial presentation and a transfer presentation. The first and second presentation records may be in sequential time order or may be out of order. That is, the timestamp from the first presentation record may represent a time after the timestamp from the second presentation record signifying that the first presentation record represents a subsequent time that a transfer presentation occurred. Again, if no transfer is found, processing may continue by waiting for a subsequent presentation record or time out. At 650, if the processor 300 determines that the pair of records represents an initial presentation and a transfer presentation, the processor 300 accounts for the initial presentation and the transfer presentation.

The database may include multiple identifiers for a single transit account. In this case, a user may present a first form of ID at a first gate and a second form of ID at a second gate. Therefore, the identifier of the first presentation record differs from the identifier of the second presentation record.

In some embodiments, the first presentation record results from a transaction between an identifying token and a token reader, wherein the identifying token does not retain information regarding the transaction. In other embodiments, the identifying token only retains an adjusted counter as a result of the transaction. In this way, the identifying tokens are effectively memoryless.

The first presentation record may result from a transaction between an identifying token and a token reader, wherein the identifying token is retrieved from at least one of a credit card and a debit card. The first presentation record may be a record of an RFID token presentation, for example from a bankcard compliant with ISO 14443 and/or ISO 7816.

At 660, the process may continue by receiving a third or forth presentation record associated with the first and second presentation records. The third presentation record, like the earlier records, contains a timestamp and an identifier to the transit account. The next presentation record is received and saved then the database is searched for previous records corresponding to this next presentation. If it is determined that the next presentation record is associated with the earlier presentation records, the processor 300 accounts for the set of presentations. For example, the first, second and third presentation records may represent an initial presentation, a first transfer presentation, and a second transfer presentation.

Such accounting may include determining a fare resulting from the initial presentation and the transfer presentation and then applying the determined fare to the transit account. The transit account may be different from but associated with a bankcard. As an example, accounting may include accounting for a single-ride fare to the transit account thereby allowing the transfer presentation to be free. At 670, accounting may be followed by settling. The processor may initiate settling the transit account with a payment account, where the payment account may be associated with a bankcard and settling may include communicating with a clearing and settlement network. In some embodiments, settling includes settling with only one or more financial institution clearing and settlement networks. In other embodiments, settling includes settling a first balance with a commuter benefit network and settling a second balance with a financial institution clearing and settlement network, and alternately, settling a third balance with an additional network, such as another commuter benefit network or another financial institution clearing and settlement network.

Embodiments of the present invention include a transit system rules processor for timepasses. Some embodiments of the present invention provide for a method of processing presentation records associated with at least one public transit network supporting an advanced-purchase fare product, the method comprising: processing a timepass record, wherein the timepass record comprises an indication of duration and an identifier to a first transit account, and wherein the act of processing the timepass record comprises receiving the timepass record representing an advance purchase of a fare product; and updating memory to indicate the first transit account identified by the timepass record is enabled for a timepass product; and processing a first presentation record, wherein the first presentation record comprises a timestamp and an identifier to the first transit account, and wherein the act of the first processing presentation record comprises receiving the first presentation record; searching the memory and determining the first transit account identified by the identifier in the first presentation record is enabled for the timepass product; and providing a discount associated with the timepass product; and processing a second presentation record, wherein the second presentation record comprises a timestamp and an identifier to a second transit account, and wherein the act of the second processing presentation record comprises receiving the second presentation record; searching the memory and determining the second transit account identified by the identifier in the second presentation record is not enabled for a timepass product; and applying a non-timepass fare rule.

In some embodiments of this method, the timepass record results from interaction with a website. In some embodiments of this method, the timepass record results from interaction with a kiosk. In some embodiments of this method, the timepass record is generated from input by a transit benefits administrator. In some embodiments of this method, the first presentation record results from a transaction between an identifying token and a token reader, wherein the identifying token does not retain information regarding the transaction. In some embodiments of this method, the first presentation record results from a transaction between an identifying token and a token reader, wherein the identifying token only retains an adjusted counter as a result of the transaction. In some embodiments of this method, the first presentation record is a record of an RFID token presentation. In some embodiments of this method, the first presentation record is a record of a bankcard presentation, where the bankcard is compliant with ISO 14443 and/or ISO 7816, and may further comprise generating a hash identifier based on at least part of a bankcard identifier number associated with the bankcard. In some embodiments of this method, the transit account is associated with a bankcard. In some embodiments of this method, the at least one public transit network comprises a plurality of public transit networks. In some embodiments of this method, one or more accounts were charged for the fare product prior to the act of receiving the purchase record. In some embodiments of this method, one or more accounts were charged for the fare product in response to the act of receiving the purchase record. In some embodiments of this method, one or more accounts were charged for the fare product in response to the act of receiving the first presentation record. In some embodiments of this method, the type of advance purchase of the purchase record indicates a multi-ride fare product; and the act of applying the discount comprises changing a count to indicate that the multi-ride fare product contains one fewer ride. In some embodiments of this method, the type of advance purchase of the purchase record indicates a time-pass fare product, and wherein the act of applying the discount comprises applying associating a zero charge to the presentation record. In some embodiments of this method, the type of advance purchase of the purchase record indicates a discounted rate for future purchases, and wherein the act of applying the discount comprises applying a discount based on the indicated discounted rate. In some embodiments of this method, the method further comprised settling the transit account with a payment account. and the payment account may be associated with a bankcard and settling comprises communicating with a clearing and settlement network. In some embodiments of this method, the method further comprises: receiving the timepass record at a processor; receiving the first presentation record at the processor; and receiving the second presentation record at the processor.

Embodiments of the present invention include a transit system rules processor for tap-in and tap-out processing. Some embodiments of the present invention provide for a method of processing tap-in/tap-out presentation record pairs associated with at least one public transit network, the method comprising: processing a first presentation record, wherein the first presentation record comprises a timestamp and an identifier to a transit account, and wherein the act of processing the first presentation record comprises receiving the first presentation record at a processor; and saving the first presentation record to memory; and processing a second presentation record, wherein the second presentation record comprises a timestamp and an identifier to the transit account, and wherein the act of processing the second presentation record comprises receiving the second presentation record at the processor; saving the second presentation record to memory; searching the memory for a presentation record corresponding to the transit account identified by the identifier in the second presentation record; determining the first presentation record and second presentation record comprises a tap-in transit presentation and a tap-out transit presentation; determining a fare resulting from the tap-in transit presentation and the tap-out transit presentation; and applying the determined fare to the transit account.

In some embodiments of this method, the first presentation record results from a transaction between an identifying token and a token reader, wherein the identifying token does not retain information regarding the transaction. In some embodiments of this method, the first presentation record results from a transaction between an identifying token and a token reader, wherein the identifying token only retains an adjusted counter as a result of the transaction. In some embodiments of this method, the first presentation record is a record of an RFID token presentation. In some embodiments of this method, the first presentation record is a record of a bankcard presentation, wherein the bankcard may be compliant with ISO 14443 and/or ISO 7816. In some embodiments of this method, the method further comprises generating a hash identifier based on at least part of a bankcard identifier number associated with the bankcard. In some embodiments of this method, the transit account is associated with a bankcard. In some embodiments of this method, the act of accounting comprises determining whether the account is associated with a time pass covering a route defined by the first and second presentation records. In some embodiments of this method, the type of the first presentation indicates a tap-out and wherein the type of the second presentation indicates a tap-in. In some embodiments of this method, the first presentation record further comprises an indication of a first location; the second presentation record further comprises an indication of a second location; and the act of determine the fare comprises determining the fare based on a distance between the first and second locations. In some embodiments of this method, the act of determining the fare comprises determining the fare based on a duration calculated from the timestamp of the first presentation and the timestamp of the second presentation. In some embodiments of this method, the method further comprises: processing a third presentation record, wherein the third presentation record comprises a timestamp and an identifier to a transit account, and wherein the act of processing the third presentation record comprises receiving the third presentation record; and saving the third presentation record to memory; and processing a time out, wherein the timeout occurs in response to not receiving a fourth presentation record corresponding to the third presentation record, wherein the act of processing the time out comprises determining a timeout fare based on receiving the third presentation record and on timing out; and applying the determined timeout fare to the transit account, wherein the method may further comprises: processing the fourth presentation record, wherein the fourth presentation record comprises a timestamp and an identifier to a transit account, and wherein the act of processing the fourth presentation record comprises receiving the fourth presentation record at the processor; saving the fourth presentation record to memory; searching the memory for a presentation record corresponding to the transit account identified by the identifier in the fourth presentation record; determining the third presentation record and fourth presentation record comprises a tap-in transit presentation and a tap-out transit presentation; determining a replacement fare resulting from the tap-in transit presentation and the tap-out transit presentation; and applying a credit for a difference between the timeout fare and the replacement fare, and wherein the method may apply a credit comprises crediting the transit account with the timeout fare and debiting the transit account with the replacement fare.

Embodiments of the present invention include a transit system rules processor for multi-funding balance processing. Some embodiments of the present invention provide for a method of processing presentation records associated with at least one public transit network, wherein transit accounts may have more than one balance, the method comprising: configuring a processor, associated with at least one public transit network, wherein the act of configuring the processor comprises storing in memory, a plurality of balance classes; storing in memory at least one rule for the prioritization of the balance classes; associating the plurality of balance classes with a respective plurality of clearing gateways; storing in memory at least one fare rule; maintaining, in memory, at least one transit account and a respective plurality of balances for the transit account; and processing a presentation record, wherein the presentation record comprises an identifier to the transit account, and wherein the act of processing the presentation record comprises receiving the presentation record at the processor; searching the memory for a transit account identified by the identifier in the presentation record; inferring, from at least one of the at least one fare rules, a resultant fare; selecting a balance from the plurality of balances associated with the transit account by using at least one of the at least one rule for the prioritization of the balance classes; accounting for the fare by applying it to the selected balance; clearing at least one of the balances associated with the transit account, wherein the act of clearing comprises sending a message to the establishing what the parties to the trade owe each other.

In some embodiments of this method, the method further comprises settling at least part of the cleared balance. In some embodiments of this method, the presentation record results from a transaction between an identifying token and a token reader, wherein the identifying token does not retain information regarding the transaction. In some embodiments of this method, the first presentation record results from a transaction between an identifying token and a token reader, wherein the identifying token only retains an adjusted counter as a result of the transaction. In some embodiments of this method, the first presentation record is a record of an RFID token presentation. In some embodiments of this method, the transit account is associated with a bankcard. In some embodiments of this method, the at least one public transit network comprises a plurality of public transit networks, wherein the process of clearing the at least one balance may comprise dividing the at least one balance among the plurality of public transit network and/or wherein the plurality of balance classes include at least one balance for each of the at least one public transit network. In some embodiments of this method, the presentation record is a record of a bankcard presentation and at least on of the plurality of clearing gateways is connected to a bankcard clearing and settling network, wherein the bankcard is compliant with ISO 14443 and/or ISO 7816, and may further comprise generating a hash identifier based on at least part of a bankcard identifier number associated with the bankcard. In some embodiments of this method, at least on of the plurality of clearing gateways is connected to a financial processor associated with a transit benefits administrator. In some embodiments of this method, the method further comprises deciding whether to clear the at last one balance, whereby the decision whether to clear the at least one balance may be based on the size of the balance and/or based on the age of the most recent transactions. In some embodiments of this method, the act of selecting the balance from the plurality of balances comprises considering whether a balance contains sufficient funds.

Embodiments of the present invention include a transit system rules processor for cross-merchant discount processing. Some embodiments of the present invention provide for a method of providing discounts to purchases, the method comprising: loading setup information, wherein the act of loading setup information comprises receiving a pairing record, wherein the merchant pairing record correlates a first merchant with at least a second merchant; saving the pairing record to a database in memory; processing a first charge record, wherein the first charge record comprises an identifier to a payment account, an identifier to the first merchant and a first monetary amount, and wherein the act of processing the first charge record comprises receiving the first charge record; and saving the first charge record to a database in memory; and processing a second charge record, wherein the second charge record comprises the identifier to the account, an identifier to the second merchant and a second monetary amount, and wherein the act of processing the second charge record comprises receiving the second charge record; saving the second charge record to memory; searching the database for a charge record having a paired merchant and corresponding to the account; finding the first charge record; and discounting at least one of the first monetary amount and the second monetary amount.

In some embodiments of this method, the act of discounting comprises reducing to zero one of the first monetary amount and the second monetary amount. In some embodiments of this method, the pairing record further comprises at least one indication of the discount applicable to the pairing, wherein: the charge record further may contain an indication of the type of charge; and the at least one indication of the discount further comprises an indication to which type of charge the discount is applicable. In some embodiments of this method, the first merchant identifier identifies a first transit agency and wherein the second merchant identifier identifies a second transit agency. In some embodiments of this method, the first merchant identifier identifies a first transit agency, wherein the second merchant identifier identifies a second transit agency, wherein the first charge record represents a first time-pass fare product, and wherein the second charge record represents a second time-pass fare product. In some embodiments of this method, the first merchant identifier identifies a first transit agency, wherein the second merchant identifier identifies a second transit agency, wherein the first charge record represents a first monthly pass, and wherein the second charge record represents a second monthly pass. In some embodiments of this method, the method further comprises sending a message to indicate a discount given. In some embodiments of this method, the method further comprises: processing a third charge record, wherein the third charge record comprises the identifier to the account, a third merchant identifier and a third monetary amount, and wherein the act of processing the third charge record comprises receiving the third charge record; saving the third charge record to memory; searching the database for a charge record having a paired merchant and corresponding to the account; finding at least one of the first charge record and the second charge record; un-discounting a previously discounted one of the at least one of the first monetary amount and the second monetary amount; and discounting at least one of the first monetary amount, the second monetary amount and the third monetary amount. In some embodiments of this method, the method further comprises: processing a reversal record, wherein the reversal record comprises at least a reference to at least one of the first or second charge record, and wherein the act of processing the reversal record comprises finding at least one of the first charge record and the second charge record; un-discounting a previously discounted one of the at least one of the first monetary amount and the second monetary amount. In some embodiments of this method, the at least one of the first charge record and second charge record is a bankcard authorization transaction. In some embodiments of this method, the at least one of the first charge record and second charge record is a bankcard settlement transaction. In some embodiments of this method, the at least one of the first charge record and second charge record is a bankcard authorization. In some embodiments of this method, the at least one of the identifier to the first merchant and the identifier to the second merchant is a Merchant Identification Number.

Embodiments of the present invention include a transit system rules processor to correct settled transaction based on new presentations or new rules. Some embodiments of the present invention provide for a method of processing presentation records associated with at least one public transit network, the method comprising: configuring a processor, associated with at least one public transit network, wherein the act of configuring the processor comprises storing in memory at least one fare rule; processing one or more presentation records, wherein each of the one or more presentation records comprises an identifier to a transit account, and wherein the act of processing the one or more presentation records comprises receiving the one or more presentation records; saving the one or more presentation records to a database in memory; inferring from at least one of the at least one fare rules and the received presentation records a resulting fare; and debiting in response to the act of inferring the resulting fare the resulting fare from an associated one or more account balances; and processing an additional presentation records, wherein the additional presentation record comprises a timestamp and an identifier to an account, and wherein the act of processing the additional presentation record comprises receiving the additional presentation record after the act of receiving the one or more presentation records; saving the one additional presentation record to the database in memory; re-apply the fare rules to the additional presentation record and the one or more presentation records; and adjusting at least one of the associated one or more account balances in response to the act of re-applying the fare rules.

Embodiments of the present invention include a method of re-interpreting presentation records associated with at least one public transit network, the method comprising: (a) configuring a processor, associated with at least one public transit network, wherein the act of configuring the processor comprises storing in memory at least one fare rule; (b) processing one or more presentation records, wherein each of the one or more presentation records comprises an identifier to a transit account, and wherein the act of processing the one or more presentation records comprises: (1) receiving the one or more presentation records; (2) saving the one or more presentation records to a database in memory; (3) inferring from at least one of the at least one fare rules and the received presentation records a resulting fare; and (4) adjusting, in response to the act of inferring the resulting fare, an associated one or more account balances by the resulting fare; and (c) processing an additional record, wherein the additional presentation record comprises an identifier to an account, and wherein the act of processing the additional record comprises: (1) receiving the additional record after the act of receiving the one or more presentation records; (2) saving the one additional presentation record to the database in memory; (3) re-apply the fare rules to the additional record and the one or more presentation records; and (4) adjusting at least one of the associated one or more account balances in response to the act of re-applying the fare rules.

In some embodiments, the act of re-apply the fare rules occurs in a batch mode. In some embodiments, the act of re-apply the fare rules occurs in response to the act of receiving the one or more presentation records. In some embodiments, the additional record is a presentation record. In some embodiments, the additional record is a presentation record and the one or more presentation records comprise: a first presentation record; and a second presentation record; wherein the at least one fare rule indicate a different resulting fare for the first and second presentation records than the fare resulting from the act of inferring. In some embodiments, each of the first, second and third presentation records comprises a timestamp, and wherein the timestamp of the additional record is between the timestamps of the first and second records. In some embodiments, the one or more presentation records each comprising a timestamp and wherein the additional record is a timepass record associated with a time of purchase and wherein the time of purchase is earlier than the timestamp of the one or more presentation records.

Embodiments of the present invention include a method for controlling access to a transit network by maintaining a blacklist in memory wherein the blacklist identifies tokens, the method comprising: (a) granting a first potential rider access to a transit system upon presentation of a first identifying token, wherein the act of granting comprises: (1) reading a first set of token data from the first identifying token using a first token reader; (2) computing a first token identifier from the first identifying token; (3) checking the first token against the blacklist in memory; and (4) using the first token identifier to allow access for the first potential rider to the transit network, if the first user token is not blacklisted; (b) denying a second potential rider access to the transit system upon presentation of a second identifying token, wherein the act of denying comprises: (1) reading a second set of token data from the second identifying token, using a second token reader; (2) computing a second token identifier from the second identifying token; (3) checking the second identifying token against the blacklist in memory; and (4) denying access to the second potential rider to the transit network, if the second user token is blacklisted; (c) adding a third identifying token to the blacklist if an outstanding balance remains unpaid, wherein the act of adding comprises: (1) unsuccessfully charging one or more payment accounts associated with the third identifying token; and (2) adding the third user token to the blacklist; and (d) removing a fourth identifying token from the blacklist after an associated monetary account is credited, wherein the act of removing comprises: (1) successfully debiting a payment account associated with the fourth identifying token; (2) crediting the associated monetary account; and (3) removing the fourth user token from the blacklist.

In some embodiments, the act of computing a token identifier from token data comprises applying a hash function. In some embodiments, the act of computing a token identifier from token data comprises extraction of a primary account identifier (PAI). In some embodiments, the blacklist comprises a uniquely identifiable subset of a larger set of identification token data. For example, instead of the blacklist being a discrete table, it may be a set of records returned from a database based on a query.

Embodiments of the present invention include a transit system rules processor operating in conjunction with a kiosk. Some embodiments of the present invention provide for an apparatus comprising: fare rule memory, which prescribes how to transform one or more token presentations to a change of a monetary balance.

The description above provides various hardware embodiments of the present invention. Furthermore, the figures provided are merely representational and may not be drawn to scale. Certain proportions thereof may be exaggerated, while others may be minimized. The figures are intended to illustrate various implementations of the invention that can be understood and appropriately carried out by those of ordinary skill in the art. Therefore, it should be understood that the invention can be practiced with modification and alteration within the spirit and scope of the claims. For example, each of the above-described methods may be performed in a computer having memory or held in a computer-readable medium having memory, wherein the memory includes machine-readable code for performing the method. Furthermore, each of the above-described methods may be embodied in a means-for apparatus. The description is not intended to be exhaustive or to limit the invention to the precise form disclosed. It should be understood that the invention can be practiced with modification and alteration.

What is claimed is:

1. A method of processing transfer rides associated with at least one public transit network, the method comprising:
processing a first presentation record, wherein the first presentation record comprises a timestamp and an identifier to a transit account, and wherein the act of processing the first presentation record comprises
receiving the first presentation record from a gate; and
saving the first presentation record to a database in memory; and
processing a second presentation record, wherein the second presentation record comprises a timestamp and an identifier to the transit account, and wherein the act of processing the second presentation record comprises
receiving the second presentation record;
saving the second presentation record to memory;
searching the database for a presentation record corresponding to the transit account identified by the identifier in the second presentation record;
finding the first presentation record;
determining the first presentation record and the second presentation record comprise an initial presentation and a transfer presentation, wherein the initial presentation and the transfer presentation occur within a predetermined amount of time, and wherein the transfer presentation represents a different transportation than represented by the initial presentation; and
accounting for the initial presentation and the transfer presentation.

2. The method of claim 1, wherein the identifier of the first presentation record differs from the identifier of the second presentation record.

3. The method of claim 1, wherein the first presentation record results from a transaction between an identifying token and a token reader, wherein the identifying token does not retain information regarding the transaction.

4. The method of claim 1, wherein the first presentation record results from a transaction between an identifying token and a token reader, wherein the identifying token only retains an adjusted counter as a result of the transaction.

5. The method of claim 1, wherein the first presentation record results from a transaction between an identifying token and a token reader, wherein the identifying token is retrieved from at least one of a credit card and a debit card.

6. The method of claim 1, wherein the first presentation record is a record of an RFID token presentation.

7. The method of claim 1, wherein the first presentation record is a record of a bankcard presentation.

8. The method of claim 7, wherein the bankcard is compliant with ISO 14443.

9. The method of claim 7, wherein the bankcard is compliant with ISO 7816.

10. The method of claim 7, further comprising generating a hash identifier based on at least part of a bankcard identifier number associated with the bankcard.

11. The method of claim 1, wherein the timestamp from the first presentation record represents a time after the timestamp from the second presentation record.

12. The method of claim 1, wherein the at least one public transit network comprises a plurality of public transit networks.

13. The method of claim 1, wherein the first presentation record was recorded by a reader within a first public transit agency, and wherein the second presentation record was recorded by a reader within a second public transit agency.

14. The method of claim 1, wherein the first presentation record and the second presentation record represent different modes of transportation.

15. The method of claim 1, wherein a first of the first presentation record and the second presentation record represents bus travel.

16. The method of claim 1, wherein a first of the first presentation record and the second presentation record represents rail travel.

17. The method of claim 1, wherein the first presentation record and the second presentation record both represent a common financial account.

18. The method of claim 1, wherein the identifier in the first presentation record equals the identifier in the second presentation record.

19. The method of claim 1, wherein the identifier in the first presentation record differs from the identifier in the second presentation record.

20. The method of claim 1, wherein the identifier in the first presentation record identifies a first bank card account and the identifier in the second presentation record identifies a second bank card account different from the first bank card account.

21. The method of claim 1, wherein the act of determining comprises evaluating a duration of time elapsed between the timestamp of the first presentation record and the time stamp of the second presentation record.

22. The method of claim 1, wherein:
the first presentation record further comprises location information of the gate of the first presentation record; and
the second presentation record further comprises location information of the gate of the second presentation record.

23. The method of claim 22, wherein the act of determining comprises evaluating a distance between a location associated with the first presentation record and a location associated with the second presentation record.

24. The method of claim 1, wherein the act of determining comprises evaluating a connection between a first commuter transit line associated with the first presentation record and a second commuter transit line associated with the second presentation record.

25. The method of claim 1, further comprising processing a third presentation record, wherein the third presentation record comprises a timestamp and an identifier to the transit account, and wherein the act of processing the third presentation record comprises:
receiving the third presentation record;
saving the third presentation record to memory;
searching the database for the first presentation record and the second presentation record corresponding to the transit account identified by the identifier in the third presentation record;
determining the third presentation record is associated with the first presentation record and the second presentation record;
determining the first, second and third presentation records comprise an initial presentation, a first transfer presentation, and a second transfer presentation; and accounting for the first and second transfer presentations associated with the first, second and third presentation records.

26. The method of claim 1, wherein the act of accounting comprises:
   determining a fare resulting from the initial presentation and the transfer presentation; and
   applying the determined fare to the transit account.

27. The method of claim 1, wherein the transit account is associated with a bankcard.

28. The method of claim 1, further comprising settling the transit account with a payment account.

29. The method of claim 28, wherein the act of settling comprises settling a first balance with a commuter benefit network and settling a second balance with a financial institution clearing and settlement network.

30. The method of claim 28, wherein the act of accounting comprises accounting for a single-ride fare to the transit account thereby allowing the transfer presentation to be free.

31. The method of claim 28, where the payment account is associated with a bankcard and settling comprises communicating with a clearing and settlement network.

32. The method of claim 1, further comprising:
   receiving the first presentation record at a processor;
   receiving the second presentation record at the processor.

33. A backend processing system for processing transfer rides associated with at least one public transit network, the system comprising:
   means for processing a first presentation record, wherein the first presentation record comprises a timestamp and an identifier to a transit account, and wherein the means for processing the first presentation record comprises
      means for receiving the first presentation record from a gate; and
      means for saving the first presentation record to a database in memory; and
   means for processing a second presentation record, wherein the second presentation record comprises a timestamp and an identifier to the transit account, and wherein the means for processing the second presentation record comprises
      means for receiving the second presentation record;
      means for saving the second presentation record to memory;
      means for searching the database for a presentation record corresponding to the transit account identified by the identifier in the second presentation record;
      means for finding the first presentation record;
      means for determining the first presentation record and the second presentation record comprise an initial presentation and a transfer presentation, wherein the initial presentation and the transfer presentation occur within a predetermined amount of time, and wherein the transfer presentation represents a different transportation than represented by the initial presentation; and
      means for accounting for the initial presentation and the transfer presentation.

34. A processing system associated with at least one public transit system, the processing system comprising:
   at least one processor;
   a first interface coupled to the at least one processor and coupled to receive a plurality of presentation records from the at least one public transit system;
   memory coupled to the at least one processor, wherein the memory is configured to hold
      the received plurality of presentation records;
      fare rules comprising at least one rule to determine whether the first presentation record and the second presentation record comprise an initial presentation and a transfer presentation, wherein the initial presentation and the transfer presentation occur within a predetermined amount of time, and wherein the transfer presentation represents a different transportation than represented by the initial presentation; and
      transit account data comprising an account state for a plurality of transit accounts; and
   a second interface coupled to the at least one processor and coupled to communicate to a payment gateway to settle the plurality of transit accounts; wherein the at least one processor is configured to apply the fare rules to the received plurality of presentation records.

35. The processing system of claim 34, wherein the first interface comprises a TCP/IP socket.

36. The processing system of claim 34, wherein the memory comprises a database to hold the received plurality of presentation records.

37. The processing system of claim 34, wherein the memory comprises a rule base comprising distinct rules to operate on the received plurality of presentation records.

38. The processing system of claim 34, wherein the memory coupled to the at least one processor comprises a memory coupled to the at least one processor via a computer bus.

39. The processing system of claim 34, wherein the memory coupled to the at least one processor comprises a socket.

40. The processing system of claim 34, wherein the second interface comprises a computer bus.

41. The processing system of claim 34, wherein the memory comprises
   a first set of data structures for the fare rules; and
   a second set of data structures for the received plurality of presentation records;
   wherein the first set of data structures are distinct from the second set of data structures.

42. The processing system of claim 34, wherein the backend processing system is located remotely from a plurality of gates.

43. The processing system of claim 34, wherein the backend processing system is co-located with a plurality of gates.

44. The processing system of claim 34, wherein the at least one public transit system comprises a plurality of public transit systems and wherein the first interface coupled to the at least one processor and coupled to receive the plurality of presentation records from the at least one public transit system comprise a first interface coupled to receive the plurality of presentation records from the plurality of public transit systems.

45. A non-transitory computer-readable medium, comprising machine readable code for
   processing a first presentation record, wherein the first presentation record comprises a timestamp and an identifier to a transit account, and wherein the code for processing the first presentation record comprises
      receiving the first presentation record from a gate; and
      saving the first presentation record to a database in memory; and
   processing a second presentation record, wherein the second presentation record comprises a timestamp and an identifier to the transit account, and wherein the code for processing the second presentation record comprises
      receiving the second presentation record;
      saving the second presentation record to memory;

searching the database for a presentation record corresponding to the transit account identified by the identifier in the second presentation record;
finding the first presentation record;
determining the first presentation record and the second presentation record comprise an initial presentation and a transfer presentation, wherein the initial presentation and the transfer presentation occur within a predetermined amount of time, and wherein the transfer presentation represents a different transportation than represented by the initial presentation; and
accounting for the initial presentation and the transfer presentation.

* * * * *